(12) United States Patent
Jannson et al.

(10) Patent No.: US 8,576,406 B1
(45) Date of Patent: Nov. 5, 2013

(54) LUMINAIRE ILLUMINATION SYSTEM AND METHOD

(75) Inventors: Tomasz Jannson, Torrance, CA (US); Ilya Agurok, Long Beach, CA (US); Thomas Forrester, Hacienda Heights, CA (US); Ranjit Pradhan, Torrance, CA (US); Min-Yi Shih, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 1067 days.

(21) Appl. No.: 12/508,500

(22) Filed: Jul. 23, 2009
(Under 37 CFR 1.47)

Related U.S. Application Data

(60) Provisional application No. 61/155,460, filed on Feb. 25, 2009.

(51) Int. Cl.
*G01B 9/02* (2006.01)
(52) U.S. Cl.
USPC .......................................................... 356/496
(58) Field of Classification Search
USPC .......... 356/496, 498, 500; 359/628, 237, 238; 362/227, 230, 237
See application file for complete search history.

(56) References Cited

U.S. PATENT DOCUMENTS

| | | | |
|---|---|---|---|
| 2,813,971 A | 11/1957 | Pickett | |
| 2,908,197 A | 10/1959 | Wells | |
| 4,001,575 A | 1/1977 | Sullivan | |
| 4,085,318 A | 4/1978 | Odle et al. | |
| 4,143,394 A | 3/1979 | Schoberl | |
| 4,425,608 A | 1/1984 | Hecker et al. | |
| 5,013,133 A | 5/1991 | Buralli | |
| 5,159,491 A | 10/1992 | Richards | |
| 5,285,318 A | 2/1994 | Gleckman | |
| 5,481,445 A | 1/1996 | Sitzema et al. | |
| 5,553,052 A | 9/1996 | Oono et al. | |
| 5,782,553 A | 7/1998 | McDermott | |
| 5,894,195 A | 4/1999 | McDermott | |
| 5,898,267 A | 4/1999 | McDermott | |
| 5,921,671 A | 7/1999 | Okuchi | |
| 5,926,320 A | 7/1999 | Parkyn | |
| 5,930,055 A | 7/1999 | Eisenberg | |
| 6,127,783 A | 10/2000 | Pashley | |

(Continued)

OTHER PUBLICATIONS

Jannson, T., Arik, E., Bennahmias, M., Nathan, N., Wang, S., Lee, K., Yu, K., Poliakov, E. "Performance metrics for integrated lighting sytems." SPIE vol. 6225, 2006.

*Primary Examiner* — Minh D A
(74) *Attorney, Agent, or Firm* — Sheppard Mullin Richter & Hampton LLP

(57) ABSTRACT

A method of constructing a non-imaging beam transformer includes reducing a tailored illumination function from a predetermined light source to a source point response illumination function; calculating a plurality of transformation pairs for the predetermined light source, the transformation pairs identifying the radii of illumination of the light source at given source output angles; determining a desired lighting profile for light output at a region of interest to be illuminated by the beam transformer; determining a surface profile of a surface of the beam transformer such that for given output angles of the light source, the transformation pairs at those output angles are satisfied to correspond to the desired lighting profile; and constructing the beam transformer having the surface profile determined based on the transformation pairs. The method can include characterizing a specific angular output distribution of a light source to calculate the transformation pairs.

27 Claims, 38 Drawing Sheets

(56) References Cited

U.S. PATENT DOCUMENTS

| | | |
|---|---|---|
| 6,181,478 B1 | 1/2001 | Mandella |
| 6,198,213 B1 | 3/2001 | Trentelman |
| 6,206,544 B1 | 3/2001 | Costa |
| 6,273,596 B1 | 8/2001 | Parkyn, Jr. |
| 6,299,337 B1 | 10/2001 | Bachl |
| 6,331,063 B1 | 12/2001 | Hashizume et al. |
| 6,445,139 B1 | 9/2002 | Marshall |
| 6,445,500 B1 | 9/2002 | Itoh |
| 6,471,375 B2 | 10/2002 | Kobayashi |
| 6,495,964 B1 | 12/2002 | Muthu |
| 6,536,923 B1 | 3/2003 | Merz |
| 6,547,423 B2 | 4/2003 | Marshall |
| 6,560,038 B1 | 5/2003 | Parkyn, Jr. |
| 6,561,690 B2 | 5/2003 | Balestriero et al. |
| 6,565,239 B2 | 5/2003 | Rizkin et al. |
| 6,578,989 B2 | 6/2003 | Osumi et al. |
| 6,607,286 B2 | 8/2003 | West et al. |
| 6,612,723 B2 | 9/2003 | Futhey |
| 6,616,307 B2 | 9/2003 | Haenen |
| 6,637,912 B2 | 10/2003 | Arumugasaamy |
| 6,679,621 B2 | 1/2004 | West et al. |
| 6,726,345 B2 | 4/2004 | Arumugusaamy |
| 6,741,351 B2 | 5/2004 | Marshall et al. |
| 6,746,325 B2 | 6/2004 | Crane |
| 6,786,619 B2 | 9/2004 | Subisak et al. |
| 6,814,470 B2 | 11/2004 | Rizkin |
| 6,819,505 B1 | 11/2004 | Cassarly |
| 6,896,381 B2 | 5/2005 | Benitez et al. |
| 6,902,291 B2 * | 6/2005 | Rizkin et al. ............... 362/153.1 |
| 6,910,785 B2 | 6/2005 | Sales |
| 6,945,675 B2 | 9/2005 | Jongewaard |
| 6,947,615 B2 | 9/2005 | Deliwala |
| 6,948,832 B2 | 9/2005 | Saccomanno et al. |
| 6,961,194 B2 | 11/2005 | Penn |
| 6,971,772 B1 | 12/2005 | Abdelsamed et al. |
| 6,988,815 B1 | 1/2006 | Rizkin et al. |
| 7,038,856 B2 | 5/2006 | Quake |
| 7,048,385 B2 | 5/2006 | Beeson |
| 7,059,728 B2 | 6/2006 | Alasaarela |
| 7,102,172 B2 | 9/2006 | Lynch |
| 7,118,236 B2 | 10/2006 | Hahm et al. |
| 7,131,750 B2 | 11/2006 | Liu |
| 7,131,760 B2 | 11/2006 | Mayer |
| 7,142,769 B2 | 11/2006 | Hsieh |
| 7,152,985 B2 | 12/2006 | Benitez et al. |
| 7,153,002 B2 | 12/2006 | Kim et al. |
| 7,172,319 B2 | 2/2007 | Holder |
| 7,178,943 B2 | 2/2007 | Holten |
| 7,178,946 B2 | 2/2007 | Saccomanno |
| 7,181,378 B2 | 2/2007 | Benitez et al. |
| 7,222,992 B2 | 5/2007 | Holten |
| 7,252,412 B2 | 8/2007 | Wijbenga |
| 7,258,467 B2 | 8/2007 | Saccomanno |
| 7,275,840 B2 | 10/2007 | Holten |
| 7,281,824 B2 | 10/2007 | Wijbenga |
| 7,300,183 B2 | 11/2007 | Kiyomoto et al. |
| 7,304,425 B2 | 12/2007 | Ouderkirk |
| 7,311,423 B2 | 12/2007 | Frecska |
| 7,322,729 B2 | 1/2008 | Nagabuchi |
| 7,329,982 B2 | 2/2008 | Conner et al. |
| 7,333,011 B2 | 2/2008 | Singer et al. |
| 7,333,276 B2 | 2/2008 | Ikuno |
| 7,347,590 B2 | 3/2008 | Lee et al. |
| 7,349,163 B2 | 3/2008 | Angelini et al. |
| 7,352,519 B2 | 4/2008 | Vinogradov |
| 7,374,313 B2 | 5/2008 | Cassarly et al. |
| 7,378,686 B2 | 5/2008 | Beeson |
| 7,390,109 B2 | 6/2008 | Li et al. |
| 7,391,162 B2 | 6/2008 | Rohlfing |
| 7,400,439 B2 * | 7/2008 | Holman ............... 359/298 |
| 7,401,948 B2 | 7/2008 | Chinniah et al. |
| 7,411,742 B1 | 8/2008 | Kim et al. |
| 7,425,084 B2 | 9/2008 | Ruud et al. |
| 7,438,444 B2 | 10/2008 | Pao et al. |
| 7,438,447 B2 | 10/2008 | Holder |
| D581,078 S | 11/2008 | Mier-Langner |
| D581,079 S | 11/2008 | Mier-Langner |
| D581,080 S | 11/2008 | Mier-Langner |
| D581,081 S | 11/2008 | Mier-Langner |
| 7,448,783 B2 | 11/2008 | Ohkawa |
| 7,503,669 B2 * | 3/2009 | Rizkin et al. ............... 362/183 |
| 8,220,959 B2 * | 7/2012 | Rizkin et al. ............... 362/245 |
| 2002/0006040 A1 | 1/2002 | Kamada et al. |
| 2002/0135298 A1 | 9/2002 | Pelka et al. |
| 2002/0163808 A1 | 11/2002 | West et al. |
| 2002/0191397 A1 | 12/2002 | Loga |
| 2003/0030808 A1 | 2/2003 | Marshall et al. |
| 2003/0058652 A1 | 3/2003 | Arumugusaamy |
| 2003/0076034 A1 | 4/2003 | Marshall et al. |
| 2003/0174513 A1 | 9/2003 | Fiegler |
| 2003/0235050 A1 | 12/2003 | West et al. |
| 2004/0046489 A1 | 3/2004 | Vetorino |
| 2004/0080947 A1 | 4/2004 | Subisak et al. |
| 2004/0114355 A1 | 6/2004 | Rizkin |
| 2004/0141324 A1 | 7/2004 | Sales |
| 2004/0227149 A1 | 11/2004 | Ibbetson et al. |
| 2004/0233665 A1 | 11/2004 | West et al. |
| 2004/0246606 A1 | 12/2004 | Benitez et al. |
| 2005/0024744 A1 | 2/2005 | Falicoff et al. |
| 2005/0077525 A1 | 4/2005 | Lynch |
| 2005/0117318 A1 | 6/2005 | Tenmyo |
| 2005/0157498 A1 | 7/2005 | Dicken |
| 2005/0169015 A1 | 8/2005 | Luk et al. |
| 2005/0185417 A1 | 8/2005 | Mayer |
| 2005/0201118 A1 | 9/2005 | Godo |
| 2005/0231952 A1 | 10/2005 | Garrett |
| 2005/0276065 A1 | 12/2005 | Saccomanno |
| 2006/0006821 A1 | 1/2006 | Singer et al. |
| 2006/0023457 A1 | 2/2006 | Leadford |
| 2006/0034097 A1 | 2/2006 | Hahm et al. |
| 2006/0083000 A1 | 4/2006 | Yoon et al. |
| 2006/0083003 A1 | 4/2006 | Kim et al. |
| 2006/0087841 A1 | 4/2006 | Chern |
| 2006/0091784 A1 | 5/2006 | Conner et al. |
| 2006/0091798 A1 | 5/2006 | Ouderkirk |
| 2006/0092644 A1 | 5/2006 | Mok et al. |
| 2006/0152820 A1 | 7/2006 | Lien |
| 2006/0152932 A1 | 7/2006 | Wu |
| 2006/0164733 A1 | 7/2006 | Gal et al. |
| 2006/0209558 A1 | 9/2006 | Chinniah et al. |
| 2006/0232961 A1 | 10/2006 | Pfund |
| 2006/0232975 A1 | 10/2006 | Pfund |
| 2006/0232993 A1 | 10/2006 | Cassarly et al. |
| 2006/0267028 A1 | 11/2006 | Lynch |
| 2006/0274531 A1 | 12/2006 | Kopf et al. |
| 2006/0285332 A1 | 12/2006 | Goon et al. |
| 2006/0291207 A1 | 12/2006 | Simon |
| 2007/0001870 A1 | 1/2007 | Rohlfing |
| 2007/0034890 A1 | 2/2007 | Daschner et al. |
| 2007/0041098 A1 | 2/2007 | Kim et al. |
| 2007/0041220 A1 | 2/2007 | Lynch |
| 2007/0064425 A1 | 3/2007 | Frecska |
| 2007/0076414 A1 | 4/2007 | Holder |
| 2007/0086204 A1 | 4/2007 | Chinniah et al. |
| 2007/0165411 A1 | 7/2007 | Abdelsamed |
| 2007/0182319 A1 | 8/2007 | Wei et al. |
| 2007/0183736 A1 | 8/2007 | Pozdnyakov et al. |
| 2007/0195527 A1 | 8/2007 | Russell |
| 2007/0195534 A1 | 8/2007 | Ha et al. |
| 2007/0211488 A1 | 9/2007 | Cassarly et al. |
| 2007/0284993 A1 | 12/2007 | Kim et al. |
| 2008/0013325 A1 | 1/2008 | Shiau et al. |
| 2008/0048553 A1 | 2/2008 | Destain |
| 2008/0074886 A1 | 3/2008 | Chang |
| 2008/0074888 A1 | 3/2008 | Chang |
| 2008/0080192 A1 | 4/2008 | Ruud et al. |
| 2008/0112156 A1 | 5/2008 | Hsieh et al. |
| 2008/0130287 A1 | 6/2008 | Holten |
| 2008/0130299 A1 | 6/2008 | Dorogi |
| 2008/0158881 A1 | 7/2008 | Liu |
| 2008/0174996 A1 | 7/2008 | Lu et al. |
| 2008/0174999 A1 | 7/2008 | Chiang |
| 2008/0192467 A1 | 8/2008 | Rizkin |
| 2008/0192480 A1 | 8/2008 | Rizkin |

(56) References Cited

U.S. PATENT DOCUMENTS

| | | |
|---|---|---|
| 2008/0204888 A1 | 8/2008 | Kan et al. |
| 2008/0205065 A1 | 8/2008 | Holten |
| 2008/0205069 A1 | 8/2008 | Laporte |
| 2008/0212322 A1 | 9/2008 | Schroll |
| 2008/0232111 A1 | 9/2008 | Laporte |
| 2008/0232114 A1 | 9/2008 | Verhaegh et al. |
| 2008/0251690 A1 | 10/2008 | Keiper et al. |
| 2008/0278943 A1 | 11/2008 | Van Der Poel |

* cited by examiner

LUMINAIRE ILLUMINATION SYSTEM AND METHOD

REFERENCE TO RELATED APPLICATIONS

This application claims priority to U.S. Provisional Patent Application No. 61/155,460, filed Feb. 25, 2009, the contents of which is incorporated herein by reference in its entirety.

TECHNICAL FIELD CROSS

The present invention relates generally to lighting and lighting systems and methods, and more particularly, some embodiments relate to LED illumination for a variety of environments.

DESCRIPTION OF THE RELATED ART

Fire was arguably one of early mankind's most important discoveries. Indeed, early men and women relied heavily on fire, not only for warmth and for cooking, but also as a source of light. Thus, fire was one of the first sources of artificial illumination, or illumination from sources other than the sun. The earliest form of artificial illumination, then, was merely burning wood as a source of lighting. However, bare wood can be difficult to keep lit and does not provide a source of bright illumination. Accordingly, artificial illumination evolved into early lamps, which are believed to have been invented around 70,000 BC. Such lamps relied on grasses, moss or other material soaked in animal fat to provide a longer lasting and brighter fire. Wicks were later added to control the rate of burning. This evolved into oil lamps which used a reservoir of oil that was soaked up, or wicked, through a wick, which could be lit. Controls were added to allow the wick length to be adjusted to control the flame.

Aristotle is believed to have said that "Light is nothing of substance. It is indefinable, featureless, and it is therefore pointless to contemplate its nature." Nonetheless, light, whether natural or artificial remains a crucial element of our existence. Accordingly, artificial lighting continued to improve. A major milestone in this evolutionary path was the development of the incandescent light bulb. Although the light bulb was first invented in the early part of the $19^{th}$ century, in 1879 Thomas Alva Edison invented a carbon filament that greatly increased the life expectancy of the bulb.

In 1959, Elmer Fridrich and Emmett Wiley are credited with developing a tungsten halogen lamp, which was an improved type of incandescent lamp. Ongoing developments on many fronts have led to increases in light output, efficiency, cost and lifetime of artificial illumination. For example, although LEDs had been around for some time, the first practical visible-spectrum LED is attributed to Nick Holonyak Jr., who developed it in 1962 while working at the General Electric Company.

Around 1999, Philips Lumileds introduced power LEDs capable of continuous use at one watt [W]. These LEDs used much larger semiconductor die sizes to handle the large power inputs. Also, the semiconductor dies were mounted onto metal slugs to allow for heat removal from the LED die. One of the key advantages of LED lighting is its low power consumption for a given level of light output. Contemporary 'white' LEDs have overtaken the efficiency of standard incandescent lighting and are appearing in numerous applications from flashlights, to light bulb replacements to automotive lighting.

Likewise, the fluorescent light is touted as a high-efficiency light source that is gaining increased popularity as a more energy-efficient alternative to incandescent sources. A fluorescent lamp uses gas-discharge technology that relies on electricity to excite mercury vapor into fluorescence, producing visible light.

Developments have also led to other improvements in light sources. For example, with many light sources, if a person looks directly into a bright source, adjustment time is required for that person's eyes to adapt when he or she looks away from a light. One type of illumination that reduces or minimizes this effect is called nondazzling or glare-free illumination. Some solutions provide nondazzling illumination by providing indirect, reflective illumination. For example, the light source (bulb, for example) is shielded from direct view and its light projected onto a ceiling and upper part of the walls. As such, the room is illuminated by reflected or indirect light. Accordingly, one could look to the reflected light source without the same dazzling effect as looking directly into the bulb. Such indirect illumination, however, typically uses additional light output to compensate for reflection losses while providing desired illumination levels in the workspace, living space or area of interest. While this can be aesthetically pleasing to some, it can also be viewed as inefficient by others.

Point sources can present a source non-dazzling illumination. Accordingly, another approach to nondazzling illumination provides a plurality of smaller light sources and the reflection is divided into a large number of zones; each zone making a contribution to the illuminated area. With this approach, an observer sees a large number of point sources (like a star field in the sky), but each such elementary source is rather weak. Generally, a light source is referred to as a point source if the resolution of the imaging instrument not sufficient to resolve the source's size, or if the source is at a very great distance. For example, stars in the evening sky can be considered point sources to an observer on the surface of the earth. Likewise, light shone through a pinhole aperture and viewed from a great distance can be considered a point source. Most artificial lighting used in commercial and residential applications is not a point source. For example, incandescent bulbs, fluorescent tubes and the like do not present as point sources in most lighting applications. With multiple point sources, a large reflector can be used so that spot separation is resolved and will create a continuous (not point-source) bright field. However, a large reflector is used and the dust and environmental pollution can introduce unwanted scattering.

Another solution for direct non-dazzling light, uses a precise, loss-free transformation of a conventional LED light source output into a spatial pattern that creates either even (or specific required distribution pattern) illumination in the designed area, by utilizing a number of optical elements. However, the usual architecture lighting does not require uniform distribution in certain direction, so proposed designs are rather overcomplicated. Still solutions apply an optical element to collimate the light source radiation, such as the output of a high power LED. Still other solutions apply collimators for short-arc and incandescent lamps. Unfortunately, collimation can present a solution that is too restrictive for obtaining a uniform distribution when a source array is used to light the environment.

BRIEF SUMMARY OF EMBODIMENTS OF THE INVENTION

According to some embodiments, a novel luminaire architecture is provided and can be used to achieve a pre-calculated spatial distribution of light intensity for LED, incandescent, short-arc lamps, fiber coupled sources, and other lighting sources. In some embodiments, luminaires include a beam transformer to shape the output pattern at the floor, at the table, or at other planes or areas of interest, and are capable of controlling the light intensity. In particular, some example embodiments provide a distribution of the emitted light at a work surface or other area of interest such that little or no adaptation period would be needed for a person to adapt their vision after looking directly into the luminaire. This can be accomplished in some applications by controlling the intensity distribution in such a manner so as to reduce or minimize the direct exposure to multiple luminaires at eye level. In some embodiments, an angular-spectrum-specific luminaire can be designed and provided to allow control of the light output in defined areas at the work surface. For example, beam transformers to direct the light output can be designed and tailored based on the angular output characteristics of the light source to better control and direct the light output for a given LED (or other) light source. The light source's particular angular spectrum characteristics—for example, its output characteristics at given output angles—is considered in designing the beam transformer. This can result in specific luminaire designs that are source angular spectrum specific.

Described herein are systems and methods for LED illumination for a variety of environments using artificial lighting, including for example business, professional, commercial or residential areas; military and civilian tents; medical, dental and surgical facilities; shipboard, submarine and other vessel lighting; large facilities such as warehouses, stadiums and hangars; and other areas to be lighted.

Some embodiments relate to reducing a lighting source's thermal signature such as, for example, by quasi-isothermic heat distribution. For example, the heat generated by the light source can be distributed over a larger area to decrease the thermal gradient between the heat sink and the ambient area. Other embodiments relate to a luminaire and power supply system that provides better quality of lighting by providing a spatial distribution of light flux within a region of interest that is preferably highly uniform. Still other embodiments relate to improved output angular characteristics of an LED source by applying a diffuser to its front surface.

In still further embodiments, aspects of the invention can be implemented to reduce or eliminate a source's dazzling effect by providing asynchronous modulation of the light intensity across a plurality of luminaires lighting a given area. According to other aspects of the invention, spectral characteristics of LEDs can be controlled to create desired environmental simulation by adding spectral control or color components. This can be done to allow artificial light sources to better mimic diurnal lighting changes, which can improve, for example, human wake-up habits in artificial lighting conditions. For example, lighting can be brightened or dimmed gradually over time to mimic sunrise and sunset conditions, and the spectral characteristics can also be adjusted to mimic those conditions as well.

Although the architectures, systems and methods described herein are discussed in many cases in terms of LED light sources, one of ordinary skill in the art will understand how these teachings can be applied for incandescent, short-arc lamps, and fiber-coupled sources and other light sources.

According to an embodiment of the invention a method of constructing a non-imaging beam transformer, includes steps of reducing a tailored illumination function from a predetermined light source to a source point response illumination function; calculating a plurality of transformation pairs for the predetermined light source, the transformation pairs identifying the radii of illumination of the light source at given source output angles; determining a desired lighting profile for light output at a region of interest to be illuminated by the beam transformer; determining a surface profile of a surface of the beam transformer such that for given output angles of the light source, the transformation pairs at those output angles are satisfied to correspond to the desired lighting profile; and constructing the beam transformer having the surface profile determined based on the transformation pairs.

In some embodiments, the light source used is a point-like-extended source. The method can include characterizing a specific angular output distribution of a light source and wherein calculating a plurality of transformation pairs uses the specific angular output distribution. In further embodiments, the step of calculating the transformation pairs comprises the steps of: dividing the light source output into a plurality of conical sections, wherein each conical section is defined by an output angle of the source; determining output flux of the light source within the conical sections; and calculating a plurality of zone radii for the output angles defining the conical sections to generate the transformation pairs. The transformation pairs can, for example, be generated according to:

$$\Delta r^2 + 2\Delta r r_i - \frac{\Delta E(\alpha_i)}{\pi H_o H(r_i) = 0}.$$

In addition, defining the surface profile comprises the step of calculating the angle q as $q+\beta_i=I+\beta_i-\alpha_i$, or $q=I-\alpha_i$, and $q'=90°-q$, where the angle I can be found from:

$$I - \arcsin\left[\frac{\sin I}{n}\right] = \alpha_i - \beta_i,$$

wherein the surface profile is determined for low source output angles based on Snell's law of refraction and geometrical relations satisfying the relationship between the between an angular source distribution, $\alpha_i$, and a spatial position at an output illumination plane, $r_i$.

The beam transformer can be configured in one embodiment to have an input surface including a first surface for high light source output angles and a second input surface for low light source output angles, and wherein defining the surface profile includes the steps of defining an angle of a tangential line, L, to the surface profile at a predetermined point as $L=\gamma+\alpha_i$, where $\gamma$ is the angle between an internal ray reflected from the surface profile at a point of interest and the tangential line; and computing the surface angle at the point of interest by trigonometrically solving based on a triangle defined by the tangential line having an angle $\beta_i$ relative to the first input surface, the plane of the input surface and the path of the internal ray entering the input surface, wherein the surface angle is given by $M=(90°+I'+\beta_i)/2$, where I' is the angle of the internal ray relative to a normal of the input surface.

A variety of light sources can be used. In one embodiment, the light source is a point-like extended source and calculating the transformation pairs comprises determining a source point response using an adaptive deconvolution process, based on tailored output distribution at a region of interest and a point-like-extended source intensity distribution in the form of circ function. As another example, the light source is a point-like extended source, and calculating the transformation pairs comprises determining a source point response using an adaptive deconvolution process, based on tailored output distribution at a region of interest and a point-likeextended source intensity distribution in the form of a smooth adaptive function to provide an adaptive aperture. The point-like source can be a point-like-extended source having a characteristic frequency $f_o$ that is less than infinity.

In one embodiment, a characteristic spatial frequency, $f_o$, of a Fourier transform of the circus function can be substantially larger than a cutoff spatial frequency, $f_1$, of a Fourier transform of the tailored output intensity distribution at the region of interest. A neutral density or neutral attenuation filter can be included to obtain the adaptive aperture.

In other embodiments, a non-imaging beam transformer includes an input surface configured to be proximate a predetermined light source and configured to receive light from the light source, a body portion bound by a lateral surface, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles. The body portion can be configured to include a positive refraction spherical lens for low source output angles and the lateral surface comprises a total internal reflection lateral surface for high source output angles. In various embodiments, the output surface can be configured to include a power output refractive surface to reduce divergence from point-like-extended sources. In addition, a Fresnel plate can be included proximal the output surface and configured to redirect light output from the beam transformer in accordance with the transformation pairs. Also, the output surface can include two power refractive surfaces and further include a Fresnel plate proximal the output surface.

The beam transformer can also be configured to include a diffuser front surface with divergent angles sufficiently large to substantially reduce ripples of an output illumination distribution. The diffuser front surface can be made using any of a number of manufacturing techniques, including an injection molding process. In some embodiments, the beam transformer and the diffuser are a monolithic structure, while in other embodiments, the diffuser is a separate structure attached to the front surface of the beam transformer.

In another example configuration, the beam transformer can include a rod disposed internally to the beam transformer and a plurality of light sources arranged around the rod, and wherein the lateral surface comprises quasi-parabolic reflector surfaces of rotation around the rod. Lateral surfaces of the beam transformer can rely on total internal reflection, or can be metallized or metallic or otherwise reflective.

The beam transformer in various configurations can be made with a light source that is a point-like extended source with a source point response that has been obtained by an adaptive deconvolution process, based on tailored output distribution at a region of interest and a point-like-extended source intensity distribution in the form of circus function.

In still further embodiments, the beam transformer has cylindrical symmetry. It can be configured such that it has a profile exhibiting a length greater than twice the width. The beam transformer can further be dimensioned to fit into a luminaire housing configured for conventional fluorescent tubes.

In yet additional embodiments, a method for illuminating an area of interest of a predefined geometry, using overlapping spots with Gaussian distribution, using an array of luminaires arranged in a hexagonal array or rectangular array, wherein the luminaires comprise an input surface configured to be proximate a predetermined light source and configured to receive light from the light source, a body portion bound by a lateral surface, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles.

A normalized intensity distribution of an example luminaire can be described by the Gaussian formula:

$$\exp\left[\frac{-r^2}{(0.4)a^2}\right],$$

where r– is distance from a center of a luminaire and a is an array constant such that a is a distance between luminaires.

An array of luminaires can also be provided and can be configured to illuminate a region of interest of a predefined geometry, using overlapping spots with Gaussian distribution at the region of interest, the array of luminaires can be arranged in a hexagonal array or rectangular array, and the luminaires can include an input surface configured to be proximate a predetermined light source and configured to receive light from the light source, a body portion bound by a lateral surface, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles. In an example implementation, the array of luminaires can be configured such that an observer's eye level is at a level different from a level of the region of interest, and wherein the luminaires appear in direct view for an observer at eye level as no more than one or two point sources.

The array of luminaires can further include a MOSFET switch to power a microcontroller used to control illumination of the light source for each luminaire. In addition, voltage adjustment to drive the source can be configured as a closed-loop system with the source and operates as a current-sensitive amplifier. The array of luminaires can further include a pulse-width modulated data generator coupled to the microcontroller to drive the light source with a time varying input signal. Further, delay modules can be included and can be disposed between the data generator and the luminaires, wherein the delay modules are configured to desynchronize the pulse-width modulated signal used to drive the plurality of luminaires.

In embodiments, the array of luminaires can be configured such that each luminaire further includes a pulse-width modulated data generator and a pseudorandom number generator coupled to the data generator and having an output coupled to drive the microcontroller to desynchronize the array of luminaires.

In additional embodiments, a non-imaging beam transformer having a form factor configured to fit conventional cylindrical housings is provided and can include: an input surface configured to be proximate a predetermined light source and configured to receive light from the light source, a body portion bound by a lateral surface and characterized as having a cylindrical symmetry, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles.

A luminaire can also be configured to include a light source having a light output that is adjustable across a plurality of wavelengths; a driver module coupled to the light source; and a control module coupled to the driver module and configured to adjust the spectral output characteristics of the light source. The control module can be configured to adjust the spectral output characteristics in accordance with a predetermined schedule. Also, the control module can be user-programmable to adjust the spectral output characteristics of the light source. The control module can also be configured to adjust the spectral output characteristics in accordance with a predetermined schedule.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 7b is a diagram illustrating a radial spatial distribution $H(r)$ for the example LED output of FIG. 7a.

FIG. 32 is a diagram illustrating an example illumination pattern for a=0.75 m, where the intensity is divided on 10 dynamic levels, and the table step is 0.1 m.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing lighting solutions for artificial lighting elements.

In one embodiment, an adaptive deconvolution method begins with the (usually Gaussian) specific output intensity of a single extended source at the region of interest, as well as from the specific spatial/angular input distribution of this source. Then, by applying an adaptive deconvolution method, the Source Point Response (SPR) is found. Then, based on the relation between the source point response and the source angular distribution, the angular-spatial transformation is found. This can be, for example, in the form of an angular-spatial look-up table. Then, by using Snell's laws and standard ray-tracing principles, the profile of the proposed LED source is found for a number of selected embodiments.

Therefore, the resultant LED illumination in some embodiments is dazzle-free, or at least relatively dazzle free. This is in contrast to conventional incandescent lighting that dazzles in direct view, which can be an unwanted or undesirable effect. In contrast, the luminaire that utilizes the adaptive deconvolution method can be configured to produce a bright illuminated spot at the region of interest (such as at the floor level or desk level) that does not dazzle. One way this can be accomplished is by having the LED illumination spots overlap at the region of interest and not at eye level, which is generally above the floor and desk levels. For example, the luminaire can be configured to adjust the angular spectrum so that the output overlaps with that of other light sources at the region of interest, but does not overlap at eye level.

Figure 1A:
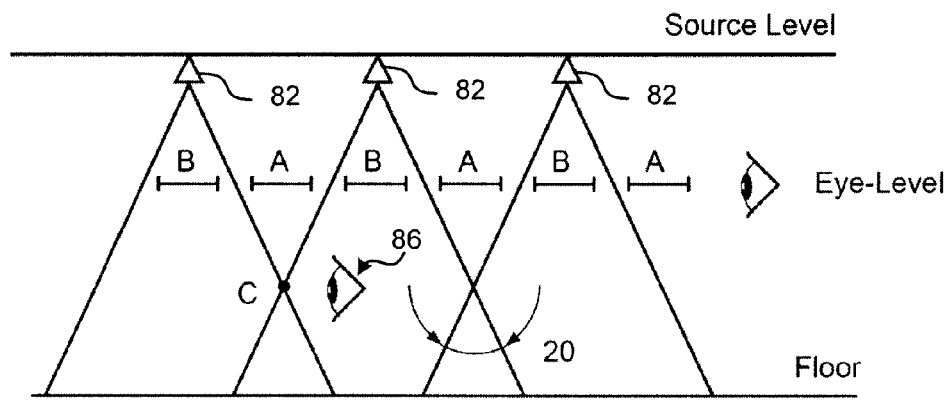
FIG. 1a is a diagram illustrating an example of controlled overlap of illumination in accordance with one embodiment of the invention.

FIG. 1a is a diagram illustrating an example of this controlled overlap of illumination in accordance with one embodiment of the invention. In this example, the light output is uniform and overlapping at the region of interest, but non-dazzling, or relatively dazzle-free at eye level. Referring now to FIG. 1a, in this example three LED sources 82 are illustrated and two zones are identified: zone A and zone B. In zone A, no direct light enters the eye 86, while in zone B, the eye 86 can receive rays only from one LED source 82. For example, in the illustrated example, eye 86 only receives rays from the center LED source of the three LED sources 82. In some embodiments, the illumination source is configured such that the direct ray excites only a very narrow region at the retina, allowing the rest of the retina to remain sensitive to the dim extended images. Even at point C, only one ray reaches the fovea of the macula because the angle between rays from neighboring fixtures in this example exceeds 20°.

In addition, point or point-like sources can be used as the light sources in the luminaires. For example, LED sources 82 can be configured as point-like sources relative to the observer. In general, by observing a very bright area as an extended light source, glare is increased. This glare mechanism is not activated by utilizing point sources.

Figure 1B:
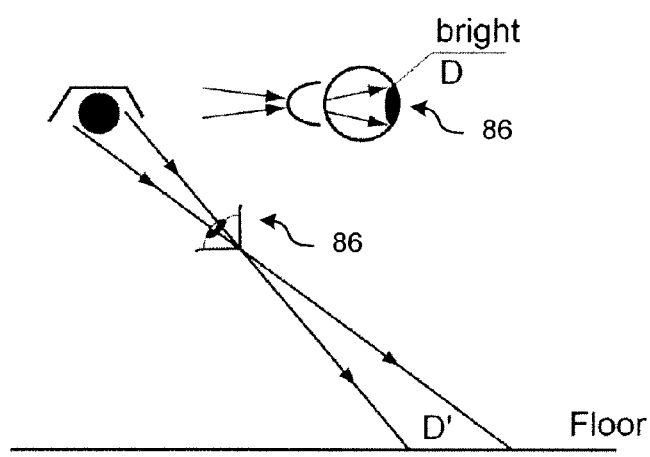
FIG. 1b is a diagram illustrating an example of conventional light source and a zone on the retina of the eye illuminated.

In contrast, in the case of conventional lamp, as illustrated in FIG. 1b, with an extended source, a larger zone D on the retina of the eye 86 is illuminated. In fact, all light impinging on zone D' at the floor also reaches the retina, saturating the entire macula and fovea; thus, making it difficult for the eye to see dim objects. Although the zone D' at the plane of the floor might be poorly illuminated, at the direct view, there is enough light energy to saturate the eye; thus, creating an image extended enough to initiate the contrast enhancement process in the eye.

It is important to realize that in such a case as that illustrated in FIG. 1b, all the area D is saturated, and when a viewer looks toward a dim area, it will take some time for the retina to normalize its sensitivity; thus, resulting in the dazzle effect. Therefore, various embodiments described herein prevent or reduce either or both mechanisms of glare-production: (1) saturation of a single retina pixel (rod, cone), and (2) accelerated development of uneven sensitivity over the retina.

Additionally, LED sources can be known to produce hot spots intensive enough to produce thermal signatures. Therefore, various embodiments are directed toward reducing those hot spots by proper heat management. Still further embodiments are related to providing asynchronous temporal modulation of the source, thus avoiding further dazzling effects related to temporal synchronization of a number of LED sources illuminating a certain region of interest.

Still other embodiments are directed toward producing a desired LED spectrum. For example, a relatively large size LED source (i.e., not a point source) can be comprised of a collection of a large number of elementary LED sub-sources with various spectra that are specially adjusted to produce a desired spectrum. For example, multi-spectral LEDs or other multi-spectral light sources can be used, and a control are provided to control the output spectrum. For example, relative contributions of individual components of a multi-spectral source can be controlled to adjust the overall output spectrum.

Figure 2:
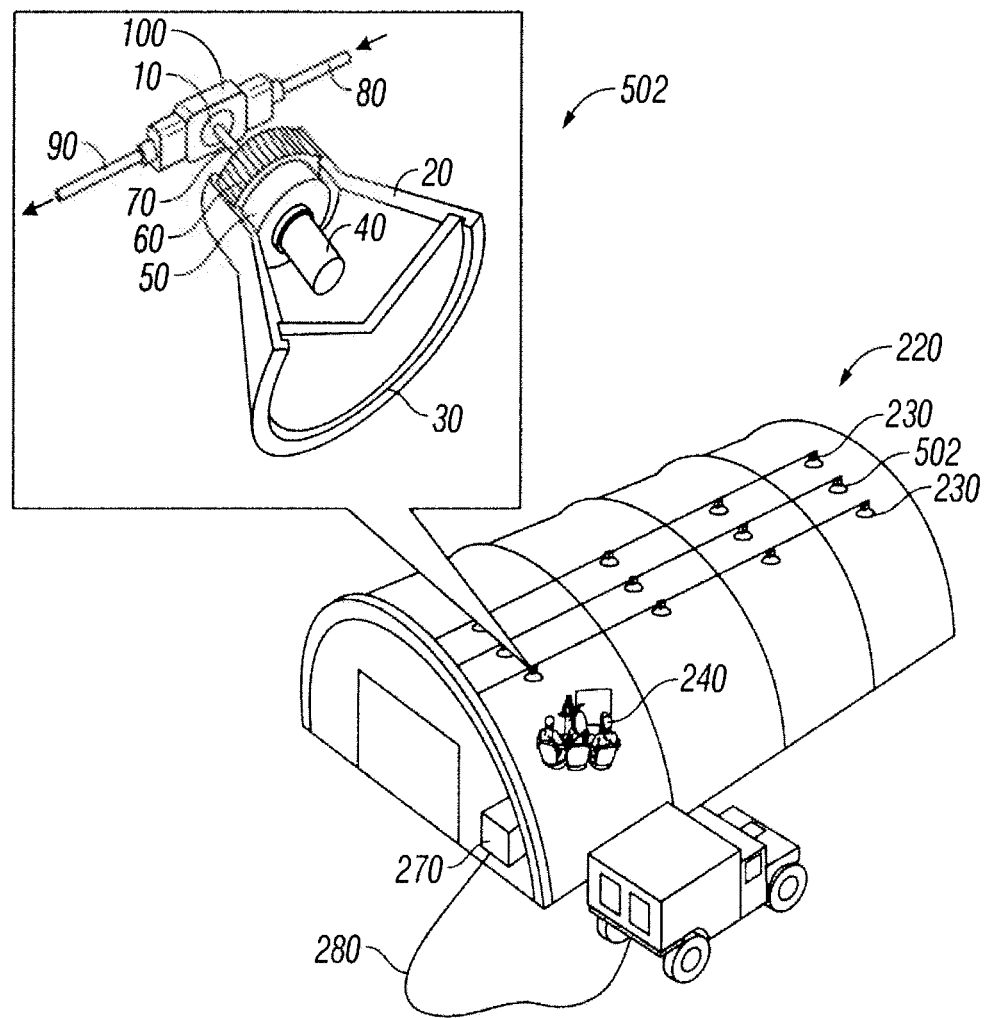
FIG. 2 is a diagram illustrating an example of an array of light sources in an example military tent application in accordance with one embodiment of the invention.

FIG. 2 is a diagram illustrating an example of an array of light sources in a military tent application in accordance with one embodiment of the invention. Referring now to FIG. 2, in this example a plurality of LED light sources 502 (only one labeled with reference number for clarity) are illustrated as being configured in an array within a tent 220.

One example embodiment of an LED source 502 is illustrated in the blow-up view. This example source 502 includes a mounting ring 10 disposed within an individual power distribution unit 100. In one embodiment, power distribution unit 100 can be configured to provide the power source requirements for the particular LED. For example, power might be distributed as AC power to reduce transmission losses and power distribution unit 100 configured to convert the distributed AC power to a DC power supply at the voltage and current levels required by the LED (individual LED or LED array) within the fixture. Additionally, power distribution unit 100 can include power filtering and conditioning, over voltage protection and other like power management circuitry.

In the illustrated example, power distribution unit 100 is attached to main power cables 80, 90 that supply the power to the unit 502. Cables 80, 90 are also used in the illustrated example to suspend the luminaire 502 above the work surfaces. Accordingly, cables 80, 90 can serve the dual role of providing power as well as structural support to suspend the luminaires 502 at the desired positions. Cable 70 can be provided to suspend the luminaire 502 below cables 80, 90. In one embodiment, cable 70 can be a retractable cable to allow height adjustment.

The example luminaire 502 also includes a heat spreader/sink 60, a printed circuit board 50, an LED 40, a luminaire housing 20, and a beamformer 30. Housing 20 can be fabricated using materials sufficiently strong to allow set-up and tear-down operations of the tent 220 or other configuration, and that are preferably light-weight and waterproof. For example, molded plastics can provide a lightweight and relatively strong housing 20, and can be snap fit, welded (bonded) or otherwise attached. The addition of gaskets or other sealing materials at the seams can enhance environmental shielding.

The tent 220, which in the illustrated example is a portable tent, includes an illumination system comprising an array of luminaires 502, in three rows 230. An illuminated target (a table) 240, is shown for illustrative purposes. In this example, a region of interest for lighting would be the work surface of table 240. Also shown are a power generator 270, a main power cable 280 to provide a source of power for the luminaires 502 and other equipment in the tent 220. A remote control can also be provided to allow control of the lighting system. In addition to on/off and brightness functions, the remote control can be configured to control other features of the luminaires such as, for example, output angle and emitted spectrum.

Example embodiments of adaptive deconvolution LED lighting are now described. Preferably, adaptive deconvolution operates on a Source Point Response (SPR) principle. This is in contrast to the edge-ray principle, which is explained by R. Winston in the well-known book: *The Optics of Nonimaging Concentrators*. Light typically enters a concentrator over a range of angles. According to the edge-ray principle, all light rays entering at the maximum angle are directed after one reflection at the edge of the exit aperture. The remaining rays at intermediate angles are reflected within this exit aperture. Accordingly, the boundary (edge) rays are analyzed to maximize concentration, or collimation, according to the $2^{nd}$ Law of Thermodynamics.

With the edge-ray principle, non-imaging optics are discussed but both the principle and the goals can be different. In Winston's case, the edge-ray principle is applied to maximize concentration/collimation efficiency. In preferred embodiments, the deconvolution mathematical principle is applied and one goal can be to tailor output light spatial distribution into specific requirements, assuming a given LED source spatial distribution and a given LED angular distribution of radiant/luminant intensity.

Figure 3:
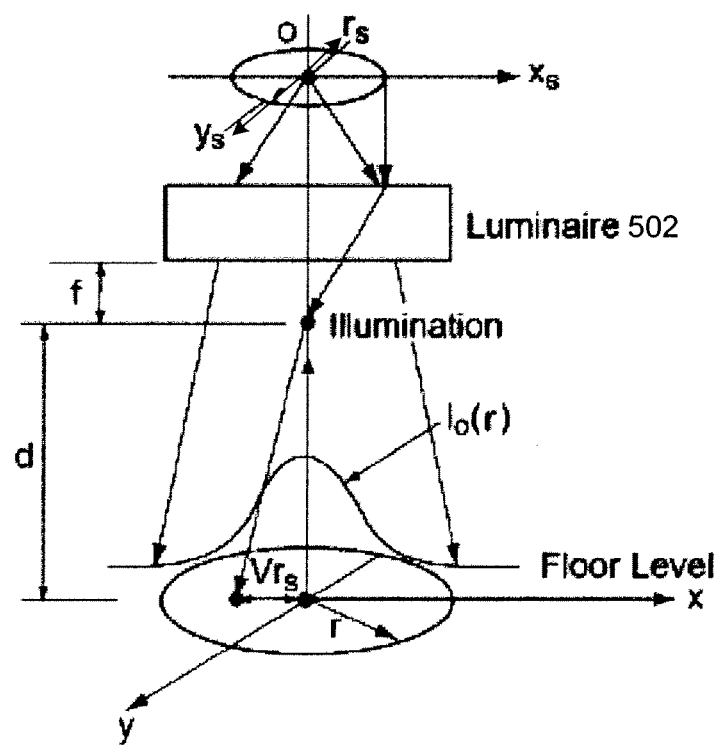
FIG. 3 is a diagram illustrating and example of illumination from an approximately circular LED source, through a non-imaging-optics beamformer in accordance with one embodiment of the invention.

In one embodiment, a non-imaging-optics beamformer is provided and configured to transform the output intensity of a circular LED source, $I_s(\vec{r}_s)$. FIG. 3 is a diagram illustrating and example of illumination from an approximately circular LED source, through a non-imaging-optics beamformer. Referring now to FIG. 3, illustrated is an example output intensity distribution at the floor level. In this example a Gaussian intensity distribution, $I_o(\vec{r})$, is defined at the floor level.

In the Linear systems approach, as in J. W. Goodman, *Introduction to Fourier Optics*, the following relation can be expressed for 2D space-invariant linear optical systems with non-coherent illumination:

$$I(x,y)=\iint h(x-x_s,y-y_s)I_s(x_s,y_s)dx_s dy_s \qquad (1)$$

where $I_s(x_s,y_s)$ is source intensity (input) distribution, $I(x,y)$ is output intensity distribution (after transformation), and $h(x,y)$ is source point response, which is space-invariant one:

$$h(x,y;x_s,y_s)=h(x-x_s,y-y_s). \qquad (2)$$

The 2D Fourier transform of Eq. (1), is $$\hat{I}(f_x,f_y)=\hat{H}(f_x,f_y)\hat{I}_s(f_x,f_y) \qquad (3)$$

where $\hat{H}(f_x,f_y)$ is Fourier transform of $h(x,y)$, and $\hat{I}(f_x,f_y)$ is a 2D Fourier transform of $I(x,y)$, in the form:

$$\hat{I}(f_x, f_y) = \hat{F}\{I(x, y)\} = \int_{-\infty}^{+\infty}\int I(x, y)\exp[-i2\pi(f_x \cdot x + f_y \cdot y)]dx dy, \qquad (4)$$

and $(f_x,f_y)$ are spatial frequencies in lines/mm.

Figure 4:
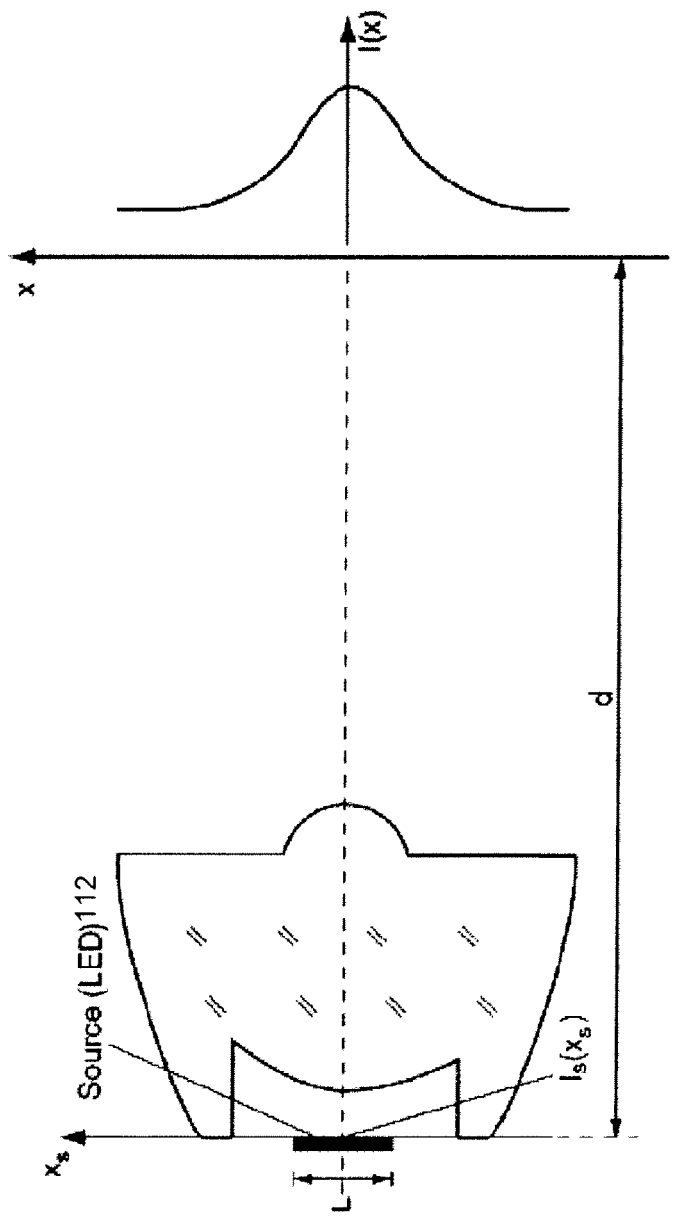
FIG. 4 is a diagram illustrating an example of a one-dimensional case to illustrate a deconvolution operation.

In order to explain deconvolution operations, a one-dimensional case can be considered for simplicity. FIG. 4 is a diagram illustrating an example of such a one-dimensional case. In such a one-dimensional case, Eq. (1) becomes:

$$I(x) = I_O(x) = \int_{-\infty}^{+\infty} h(x - x_S)I_S(x_S)dx_S, \qquad (5)$$

where the left side of Eq. (5) means that it would be preferred to tailor output intensity distribution, $I(x)$, into a given: $I_o(x)$ profile. The goal is to find $h(x)$ from the known: $I_o(x)$ and $I_s(x_s)$. Then, the inverse one-dimensional form of Eq. (3), is:

$$\hat{H}(f_x)=\hat{I}_o(f_x)\hat{I}_s^{-1}(f_x). \qquad (6)$$

Therefore, the existence of zeroes of the one-dimensional transform, $\hat{I}_s(f_x)$, creates infinities of function $\hat{I}_s^{-1}(f_x)$ in Eq. (6), and the deconvolution formula (6) will then have singularities. The mitigation of these singularities is a principal goal of a typical deconvolution process. Assume, for example, that the source LED 112 as in FIG. 4 has uniform intensity distribution within the segment of length-L and zero otherwise. Then, in that case $$I_S(x_S) = rect\left(\frac{x_S}{L}\right) = \begin{cases} 1, \text{ for } |x_S| \le \frac{L}{2} \\ 0, \text{ for } |x_S| > \frac{L}{2}. \end{cases} \quad (7)$$

The Fourier transform of Eq. (7), is $$\hat{I}_S(f_X) = \mathrm{sinc}(f_X \cdot L); \mathrm{sinc}(x) \equiv \frac{\sin \pi x}{\pi x}, \quad (8)$$

so indeed, function $\hat{I}_s(f_x)$ has zeros, for:

$$x = 1, 2, 3, \ldots; \quad (9)$$

and $\hat{I}_s^{-1}(f_x)$ has infinities in those points.

Now, in order to solve one case completely, consider the situation without singularities, such as:

$$I_S(x_S) = Ae^{-\left(\frac{x_S}{a}\right)^2}; I_O(x) = Be^{-\left(\frac{x}{b}\right)^2}, \text{ then,} \quad (10)$$

$$\hat{I}_S(f_X) = Aa\sqrt{\pi}e^{-\pi^2 f_X^2 a^2}; \hat{I}_O(f_X) = Bb\sqrt{\pi}e^{-\pi^2 f_X^2 b^2}, \text{ and,} \quad (11)$$

$$\hat{H}(f_X) = \hat{I}_O(f_X)\hat{I}_S^{-1}(f_X) = \frac{Bb}{Aa}e^{-\pi^2 f_X^2 c^2}, \text{ where:} \quad (12)$$

$$c_2 = b^2 - a^2; \text{ thus, } b > a \text{ and the solution, is} \quad (13)$$

$$h(x) = De^{-\left(\frac{x}{c}\right)^2}; D = \frac{Bb}{Aa}\frac{1}{\sqrt{\pi(b^2-a^2)}} \quad (14)$$

Figure 5:
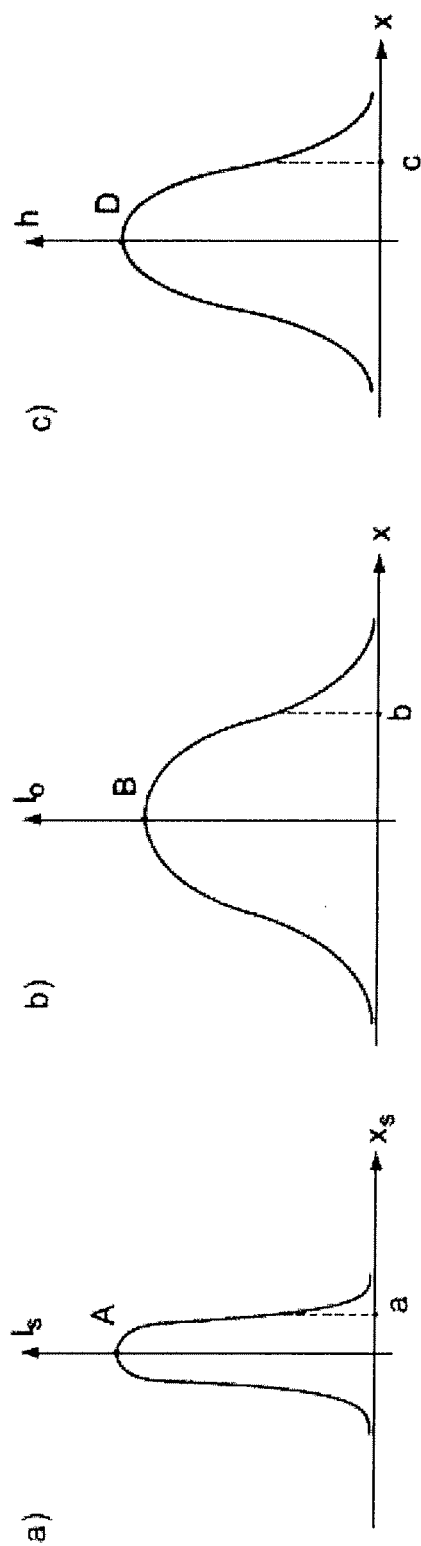
FIG. 5, is an illustration of the one-dimensional deconvolution problem, including: (a) $I_s(x_s)$; (b) $I_o(x)$; and (c) $h(x)$, where $I_o(x)$, $I_s(x_s)$ and $h(x)$ are Gaussian.

Accordingly, all three functions: $I_o(x)$, $I_s(x_s)$ and $h(x)$ are Gaussian, as shown in FIG. 5 for the one-dimensional Gaussian case, which is an illustration of the one-dimensional deconvolution problem, including: (a) $I_s(x_s)$; (b) $I_o(x)$; and (c) $h(x)$.

For the 2D circular deconvolution problem, illustrated in FIG. 3, the situation is more complex and formulas should be applied under careful conditions. Nevertheless, such formulae can be useful for estimating a range of the solution. One such formula, being the equivalent of Eq. (1) with circular symmetry, has the following form:

$$I_O(r) = 2\pi \int_0^{r_{SO}} I_S(r_S)h(r - Vr_S)r_S \, dr_S, \quad (15)$$

where, the magnification, V, is $$V = \frac{d}{f}, \quad (16)$$

and where f is the focal length of the system and d is the distance, as in FIG. 3. This is a simplified version of Eq. (1), ignoring skew rays for $r_s \ne 0$, and should not be treated as a mathematical derivation of Eq. (1). Nevertheless, it can be applied for certain estimations as discussed below.

For example, assume a typical distance, d, (from a source to a floor, for example) is 3 m, or d=3000 mm; and, from general considerations, assume the size of the luminaire is about 2f. Then, assume f=12 mm, and a source radius, $r_{so}$=1 mm. Then, according to Eq. (16), V=250, and Eq. (15) is rescaled by introducing new a variable:

$$r' = Vr_S; r_S = \frac{r'}{V}; dr_S = \frac{dr'}{V}. \quad (17)$$

compared to Eq. (15), all coordinates have the same form r' and rescaled based on magnitude, V, it becomes:

$$I_O(r) = \frac{2\pi}{V^2}\int_0^{r'_O} I_S(r')h(r-r')r' \, dr', \quad (18)$$

where $r'_o$=250 mm, and the source intensity distribution is rescaled into output (floor) intensity distribution, in the form:

$$I_S(r') = circ\left(\frac{r'}{r'_O}\right) = \begin{cases} 1, \text{ for } r' \le r'_O \\ 0, \text{ for } r' > r'_O, \end{cases} \quad (19)$$

which shows that there is a relatively uniform distribution in an area defined by $r'_o$ and negligible or no distribution outside that area. Then, its Fourier transform, is $$\hat{I}_S(f) = \frac{J_1(2\pi f \cdot 250)}{f}; f = \sqrt{f_x^2 + f_y^2} \quad (20)$$

where $J_1$ is a Bessel function of the 1st kind and 1st order, and its first zero is:

$$f_O = \frac{0.61}{250}$$

in lines/mm. This is because, according to M. Born and E. Wolf, *Principles of Optics*; the first zero of $J_1(x)$ is for $x_o$=1.22$\pi$; thus, $2\pi f_o \cdot 250$=1.22$\pi$, and $f_o$=0.61/250 mm$^{-1}$.

Figure 6:
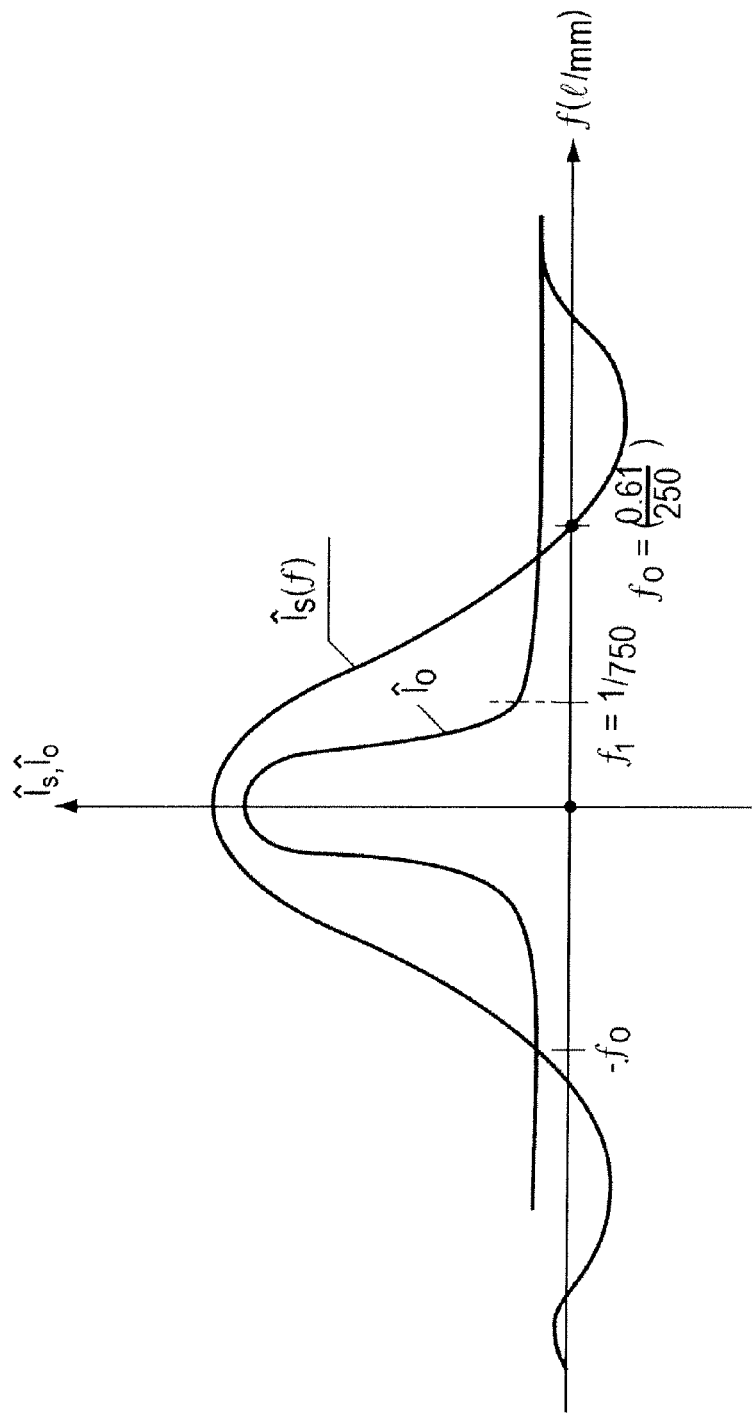
FIG. 6 is a diagram illustrating a typical relation between Fourier transforms $\hat{I}_s$ and $\hat{I}_o$.

The Fourier transform can be rewritten as:

$$\hat{I}_o(f) = \hat{I}_S(f)\hat{H}(f) \quad (21)$$

Where $\hat{I}_s(f)$ is given by Eq. (20). FIG. 6 is a diagram illustrating a typical relation between Fourier transforms $\hat{I}_s$ and $\hat{I}_o$. As shown in FIG. 6, the first zero of the Fourier transform, $f_o$ is not infinity as it would be with a point source. Now, assume that $I_o(r)$ has Gaussian shape with typical size at the floor, of about 750 mm, so $\hat{I}_s$ and $\hat{I}_o$ are related, as in FIG. 6. As this illustrates, that cutoff-frequency, $f_1$, of $\hat{I}_o$ is smaller than the location of the 1st zero of $\hat{I}_s$, $f_0$:

$$f_1 < f_0 \quad (22)$$

This mitigates the singularity problem at f=$f_0$. Note that the cutoff is related to the geometry of the source. Because $f_0$ is related to the size of the source, the beamformer should not be designed in isolation. Although, because $\hat{I}_s$ has zeros and $\hat{I}_o$ does not, function $\hat{H}$ has no solutions in the continuous functions domain. The only way to define $\hat{H}$ is to correct function $\hat{I}_o$ by adding function $\Omega$ with minimum distortion in $\hat{I}_o$ (by mean-square value sense), which will deliver zeros in the frequency domain; thus, making ($\hat{I}_o+\Omega$)-function dividable by $\hat{I}_s$:

$$\hat{H} = \text{``}\frac{0}{0}\text{''} = \frac{(\hat{I}_O + \hat{\Omega})}{\hat{I}_S}. \tag{23}$$

Accordingly, auxiliary function $\Omega$ should be defined in distributions domain, as:

$$\hat{\Omega} = \begin{cases} -\hat{I}_o, \text{ for } f = f_o \\ 0, \text{ for } f \neq f_o \end{cases} \text{ and,} \tag{24}$$

$$\lim_{f \to f_o} \frac{\hat{I}_O + \hat{\Omega}}{\hat{I}_S} < \infty. \tag{25}$$

It is shown in the analysis of distributions (distributions are non-regular functions that can be presented in the forms of asymptotic functional sets; an example of such a function is a Dirac delta function), that such correction introduces only minor disturbance of function $\hat{H}$, or it is equivalent to introducing ripples into $\hat{I}_o$ function, in cosine form, with amplitude of $\hat{I}_o(f_o)/\hat{I}_o(o)$. Referring again to FIG. 3, it can be seen that this amplitude can be very small for $f \gg f_1$. In the specific example illustrated in FIG. 3, $f_0=0.00244$ and $f_1=0.00133$. Accordingly, $f_0/f_1=1.83$, and the ($f \gg f_1$)-condition is only approximately satisfied. Nevertheless, this criterion provides good guidance for system design for proper tailoring of the $\hat{H}$ function, and in turn, the proper adjustment of the SPR-function, in the form:

$$SPR(r) = F^{-1}\{H(f)\}, \tag{26}$$

where $\hat{F}^{-1}(\ldots)$ is a Fourier-Bessel transform for circular functions.

In the context of the systems and methods described herein, it can be important to recognize differences between an LED point source and an LED point-like extended source. An LED point source is discussed in U.S. Pat. No. 6,547,423, to Phillips, titled "LED Collimation Optics With Improved Performance And Reduced Size." In this document, the luminaire is described as acting as a collimator. In contrast, the point-like extended LED source described in some embodiments herein has extended sizes that dictate different (in some cases radically different) luminaire design. In some cases, the LED source can be collapsed to a point LED source, as in the above Phillips patent.

The general formula for characteristic frequency, $f_0$, determining the position of the 1st zero, as in FIG. 6, is $$f_O = \frac{0.61}{r'_O} = \frac{0.61}{r_{SO}}, \tag{27}$$

and for the point LED source:

$$r_{so} \to 0 \Rightarrow f_0 \to \infty. \tag{28}$$

in other words, $f_0 \gg f_1$. Accordingly, there is no singularity and the deconvolution problem is not relevant. Furthermore, certain embodiments disclosed herein address a more complex variable distribution of output intensity, $I_o(r)$. Additionally, the point-like extended sources used in some embodiments to not move toward infinity as does a point LED source as shown in equation 28.

Figure 7A:
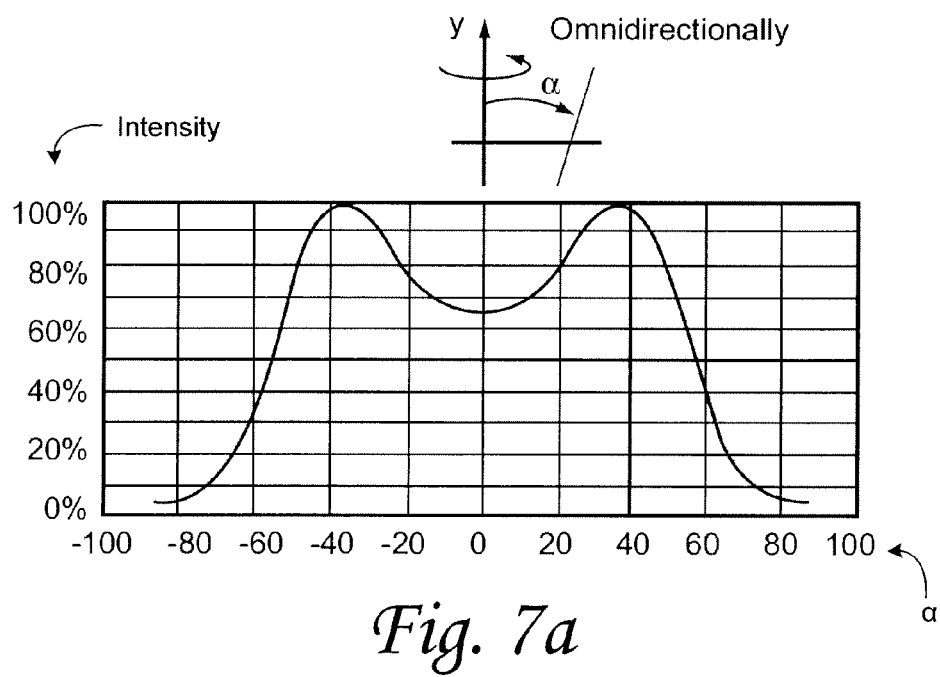
FIG. 7a is a diagram illustrating an example angular distribution of a representative LED output.
Figure 7B:
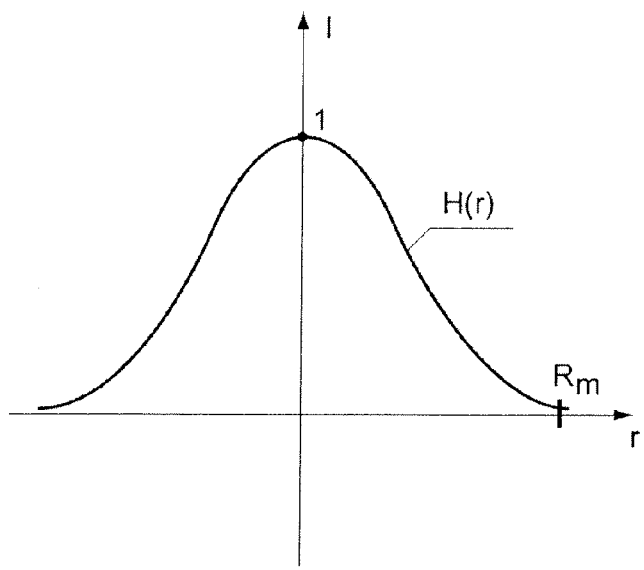

Embodiments of the luminaire can be implemented to transform the LED output from a given LED source point to a tailored source point response illumination function denoted here as H(r). FIG. 7a is a diagram illustrating an example angular distribution of a representative LED output. FIG. 7b is a diagram illustrating a radial spatial distribution H(r) for the example LED output of FIG. 7a. The LED output is in the form of an angular distribution, which can have a circular symmetry, but, in general, can have some anisotropy. In FIG. 7b, function H(r) is reduced to a normalized intensity, with a maximum value, and it shows the profile of the illuminated spot for the example LED. The actual achievable illumination level can be calculated from the law of conservation of energy, wherein:

$$E_o = 2\pi \int_o^{r_m} H_o H(r) r dr, \tag{29}$$

where $E_o$ is the overall LED output in lumens. This can be used to arrive at the illumination level:

$$H_o = \frac{E_o}{2\pi \int_o^{r_m} H(r) r dr}$$

where $H_o$ is expressed in $lm/m^2$, or lux, and absolute tailored floor intensity is:

$$H_A(r) = H_o H(r). \tag{30}$$

Figure 8:
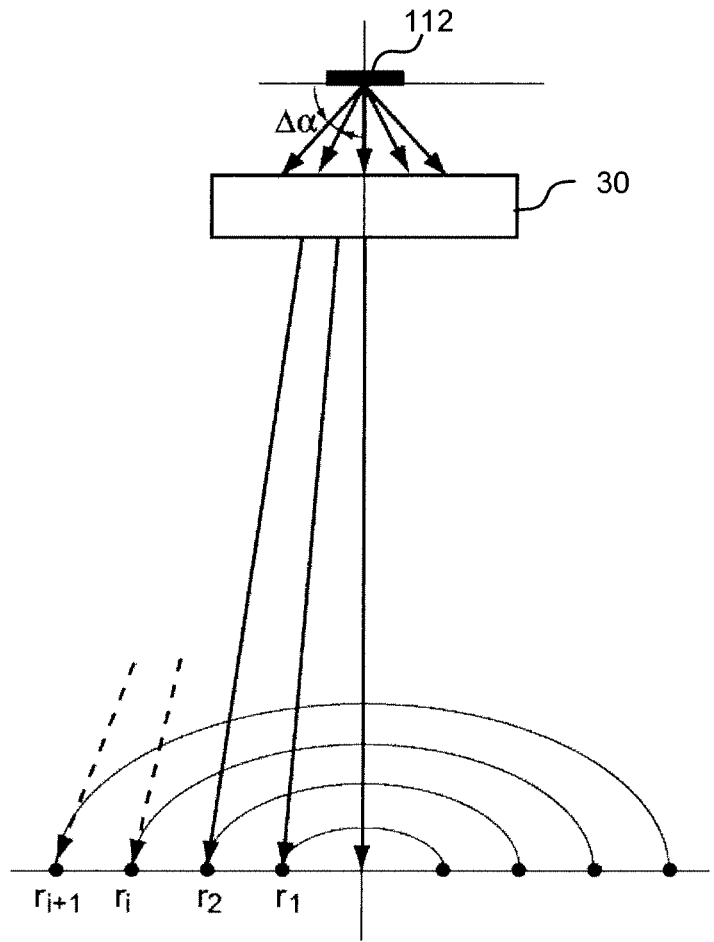
FIG. 8 is a diagram illustrating an example redistribution of LED output in accordance with one embodiment of the invention.

In order to achieve the tailored illumination, $H_A(r)$, in various embodiments the luminaire is configured such that the LED output is preferably specifically redistributed at the region of interest. Particularly, in some embodiments the beamformer 30 of the luminaire is designed to achieve the desired redistribution. FIG. 8 is a diagram illustrating redistribution of LED output in accordance with one embodiment of the invention. In particular, in FIG. 8, the evenly divided conical sections with steps, $\Delta\alpha$, are redistributed into concentrated rings at the floor. Every conical segment of the LED output contains $dE(\alpha)$ amount of flux.

Figure 9:
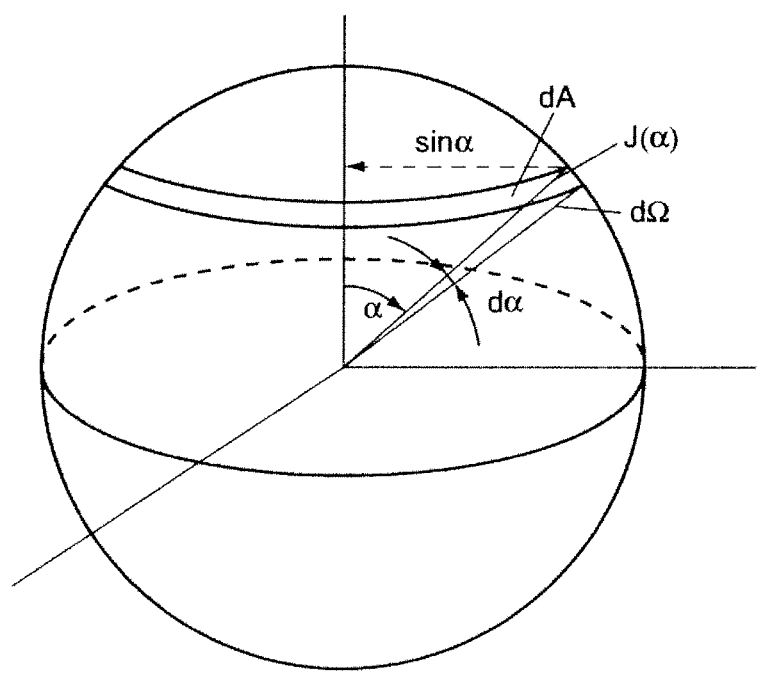
FIG. 9 is a diagram illustrating output flux $dE(\alpha)$, within a segment $d\alpha$, where $J(\alpha)$ is radian/luminant intensity in Cd.

FIG. 9 is a diagram illustrating output flux $dE(\alpha)$, within the segment $d\alpha$, where $J(\alpha)$ is radiant/luminant intensity in Cd. The infinitesimal flux emitted from a source, $\Delta E(\alpha)$, is $$dE(\alpha) = \left(\frac{dA}{R^2}\right) J(\alpha) = \frac{(R d\alpha)(2\pi R \sin\alpha)}{R^2} J(\alpha) = 2\pi \sin\alpha J(\alpha) d\alpha, \tag{32}$$

where $J(\alpha)$ is radiant/luminant intensity in direction, defined by $\alpha$, expressed in W/sr, or Lm/sr or Cd, and $$d\Omega = \left(\frac{dA}{R^2}\right),$$

is the infinitesimal solid angle within the segment $d\alpha$, shown in FIG. 9.

Assume that a tailored illumination is achieved at the floor (or other target) area, up to radius, $r_i$, including right choices of radii from $r_1$, to $r_{i-1}$, where $$r_{i+1} = r_i + \Delta r. \tag{33}$$

The value $\Delta r$ can be found from the area of a ring, with thickness, $\Delta r$, and energy $\Delta E_i$, where $$\Delta E(\alpha_i) = H_o(r_i) \lfloor \pi(r_{r+1})^2 - \pi r_i^2 \rfloor \tag{34}$$

$$H_O H(r_i) = \frac{\Delta E(\alpha_i)}{\pi[r_i^2 + 2r_i\Delta r + \Delta r^2 - r_i^2]}, \quad (35)$$

so, $\Delta r$, can be found from the following square equation:

$$\Delta r^2 + 2\Delta r r_i - \frac{\Delta E(\alpha_i)}{\pi H_O H(r_i)} = 0, \quad (36)$$

where $\Delta E(\alpha_i)$ can be found from Eq. (32).

Eq. (36) generates the straightforward iteration process, which produces pairs of $(\alpha_i, r_i)$, in the form of transformation table such as the Table 1.

TABLE 1

Transformation Table between the LED Output and Illuminated Zone Radii at the Floor, in the Form of Pairs: $(\alpha_i, r_i)$

| LED Output Angle (°) | $r_i$(mm) |
|---|---|
| 5 | 55.6102 |
| 10 | 112.6691 |
| 15 | 171.5336 |
| 20 | 232.9580 |
| 25 | 296.5273 |
| 30 | 361.9433 |
| 35 | 430.6060 |
| 40 | 499.6739 |
| 45 | 563.3636 |
| 50 | 619.1970 |
| 55 | 664.6548 |
| 60 | 697.6560 |
| 65 | 720.9869 |
| 70 | 736.1956 |
| 75 | 744.7776 |
| 80 | 750.0000 |

In Table 1, an example of transformation pairs $(\alpha_i, r_i)$, to evenly illuminate the 450 mm radius circular area, at the floor, at 3 meter distance from a Lumiled Luxeon V Star LED, with +80° LED output, available from the Philips Lumileds Lighting Company, is shown. After reading this description, it will become apparent how such a transformation table can be generated for other light sources given their characteristics.

FIGS. 10, 11, 12, 13 and 14 provide example embodiments of an LED luminaire. Particularly, FIGS. 10, 11, 12, 13, and 14 provide example embodiments of an LED source in conjunction with various configurations of beamformers or beam transformers. Each of these embodiments are now described. In these embodiments, the target surface is described as a floor, however, as with other embodiments, the target surface can be a tabletop, workbench or other desired target surface. The critical surfaces of these and other embodiments can be designed to satisfy a transformation table such as the example Table 1. In addition, in these embodiments, the beam transformers can be made using glass, acrylic, lexan, polycarbonate, solgel, epoxy, polyethylene, optical ceramics, or other appropriately transparent materials with desired refractive properties for the given spectrum. As a further example, chalcogenide glass can be used for light sources in the infrared spectrum.

Figure 10:
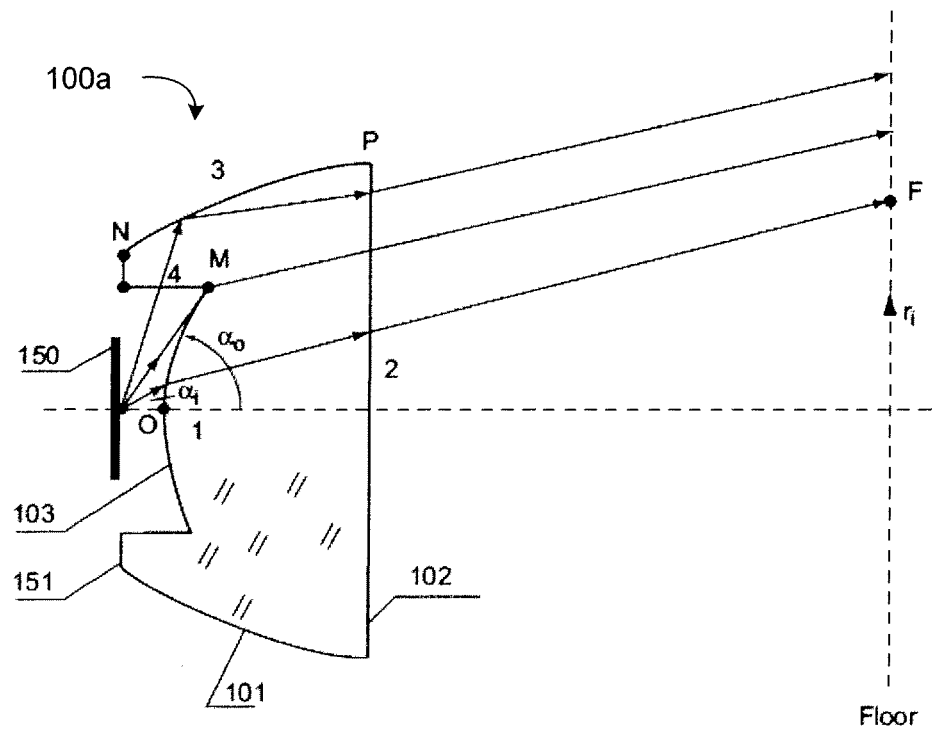
FIG. 10 is a diagram illustrating an example embodiment of a beam transformer in accordance with one embodiment of the invention.

FIG. 10 is a diagram illustrating a non-imaging beam transformer 100a in accordance with one embodiment of the invention. Referring now to FIG. 10, the example beam transformer 100a includes a plurality of surfaces 101, 102, 103, and 151. In this example, an aspheric surface 103 is provided and is configured to transform low-angle outputs of the LED 150 by means of refraction. High output angles of LED 150 are transformed by surface 101 by means of total internal reflection. Both surfaces, together with plane surface 102, are designed to the desired lighting output, in accordance with transformation table $(\alpha_i, r_i)$, as in Table 1, as an example, including LED source 150 and neutral surface 151.

Figure 11:
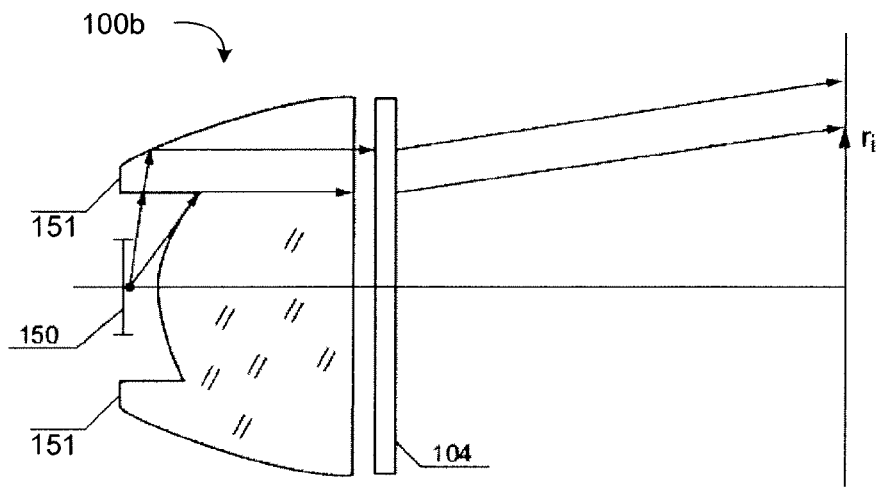
FIG. 11 is a diagram illustrating another example embodiment of a beam transformer in accordance with one embodiment of the invention.

FIG. 11 is a diagram illustrating an example beam transformer that includes a Fresnel plate in accordance with one embodiment of the invention. Referring now to FIG. 11, in this embodiment, the beamformer 100b is presented with a custom Fresnel plate or microprism lens 104 to facilitate a proper ray-tracing, in accordance with transformation table $(\alpha_i, r_i)$, as in Table 1, as an example.

Figure 12:
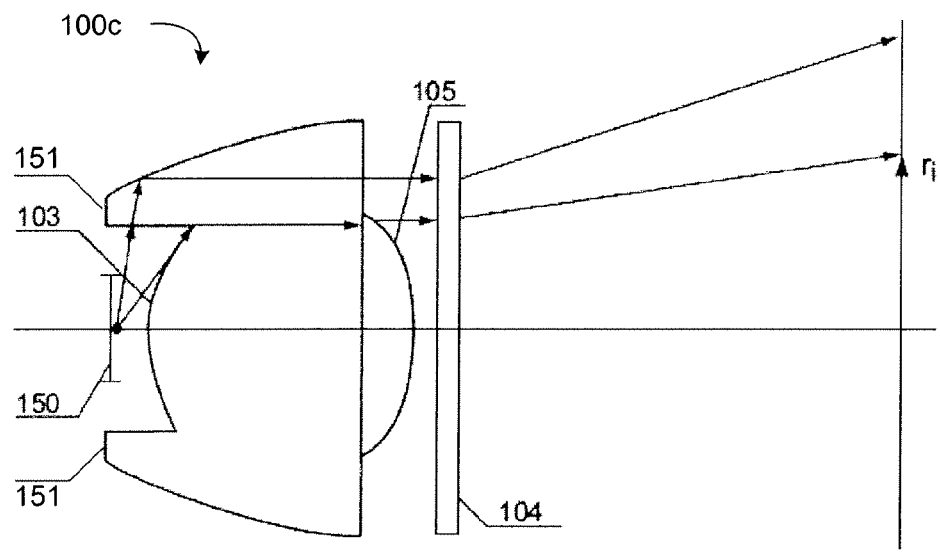
FIG. 12 is a diagram illustrating another example embodiment of a beam transformer in accordance with one embodiment of the invention.

FIG. 12 is a diagram illustrating another example beam transformer in accordance with one embodiment of the invention. In this embodiment, as shown in FIG. 12, the focusing power of beamformer 100c is split between a surface 103 and surface 105, in order to minimize the divergence of extended source, and make the LED luminaire more compact.

Figure 13:
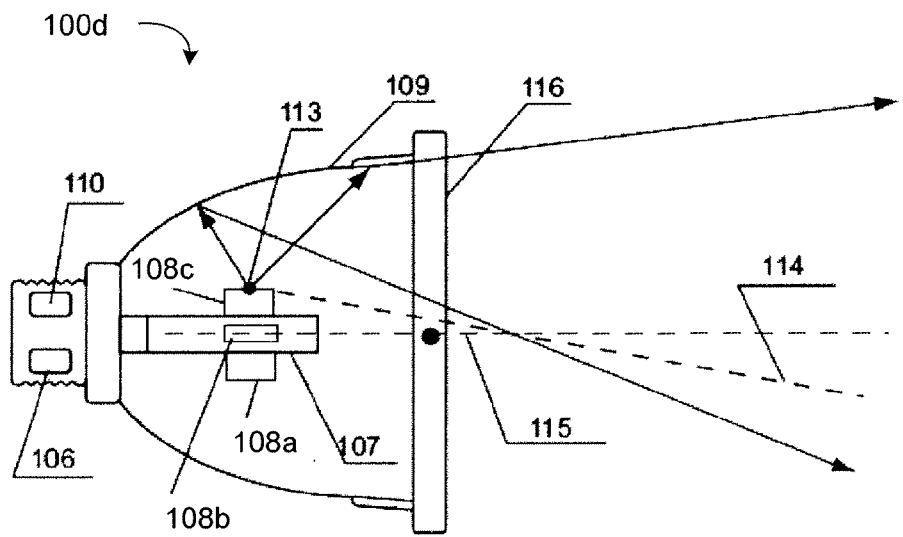
FIG. 13 is a diagram illustrating another example embodiment of a beam transformer in accordance with one embodiment of the invention.

In FIG. 13, the fourth embodiment is shown, where a number of LEDs, 108a, 108b, and 108c are mounted around a central rod 107, illuminating sideways ray illuminated from surface 113. The metallic reflector is a quasi-parabola of rotation around axis 115. Quasi-parabolas' axis 114 crosses the LED surface 113 (in a particular case, a quasi-parabola becomes off-axial parabola of rotation). In the illustrated example, the LED power supply 110 is mounted into an Edison connector 106. While the embodiments illustrated in FIGS. 10, 11, 12 and 14 utilize a material with a refractive index different from that of air to achieve reflection and refraction in accordance with Snell's law, the embodiment of FIG. 13 uses air surrounded by the metallic reflector 109. Also, the illustrated example includes a protective cover 116 such as glass, polycarbonate or other protective material.

Figure 14:
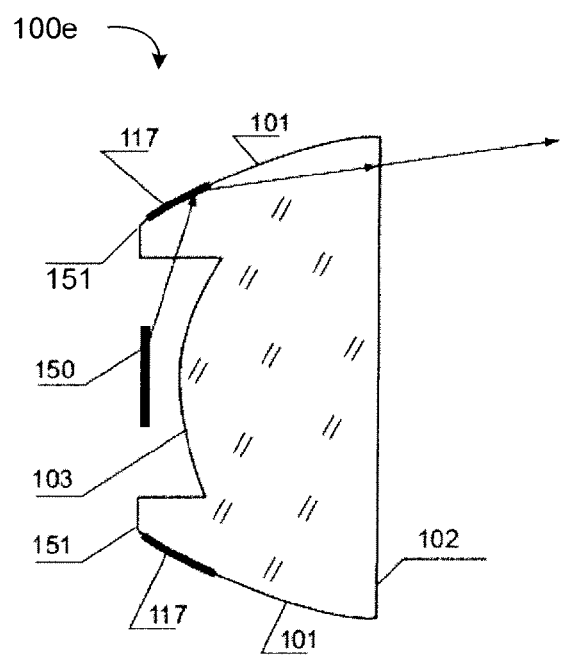
FIG. 14 is a diagram illustrating another example embodiment of a beam transformer in accordance with one embodiment of the invention.

FIG. 14 is a diagram illustrating still another example embodiment of an LED luminaire. Referring now to FIG. 14, this embodiment is similar to the first embodiment as shown in FIG. 10. However, in the example illustrated in FIG. 14, part of surface 101 near the source, is covered by a reflective coating 117 such as a metallic layer. The inclusion of a metallic coating 117 can facilitate internal reflection. For example, a metallic coating 117 can provide regular Fresnel reflection from the metallic interface instead of relying solely on total internal reflection as a result of the critical angle between the transformer 100e. With a reflective metallic coating 117, internal reflection is achieved without the same limitations imposed by Snell's law. Accordingly, reflective coatings 117 can be used to allow a more compact design. With the example illustrated in FIG. 14, the reflective coating 117 is provided near the light source as this is the area of the beam transformer 100e at which the angles of incidence are sharper and total internal reflection is more difficult to achieve relying on differences in refractive indices.

A transformation table (see as Table 1 as an example) can be generated and can be used to provide data that can be used to reshape LED source point outputs to achieve the desired tailored source point response. Such a table can be used to determine, for a given ray with an output angle c, its position, $r_i$, at the floor area or other area of interest where it is being targeted. The critical surfaces of the transformer (for example, surfaces 101 and 103, as shown in FIG. 10), direct the rays in such a way as to satisfy the transformation pairs $(\alpha_i, r_i)$, as in Table 1, as an example. Examples herein illustrate how the transformation table can be used to generate an approximately circular beam pattern, which can be useful in a uniform array of luminaires. As these examples serve to illustrate, the transformation pairs can be used to generate other light patterns at the region of interest. Such patterns can be useful to tailor lighting based on architecture, the work space or available placement for array elements.

Figure 15:
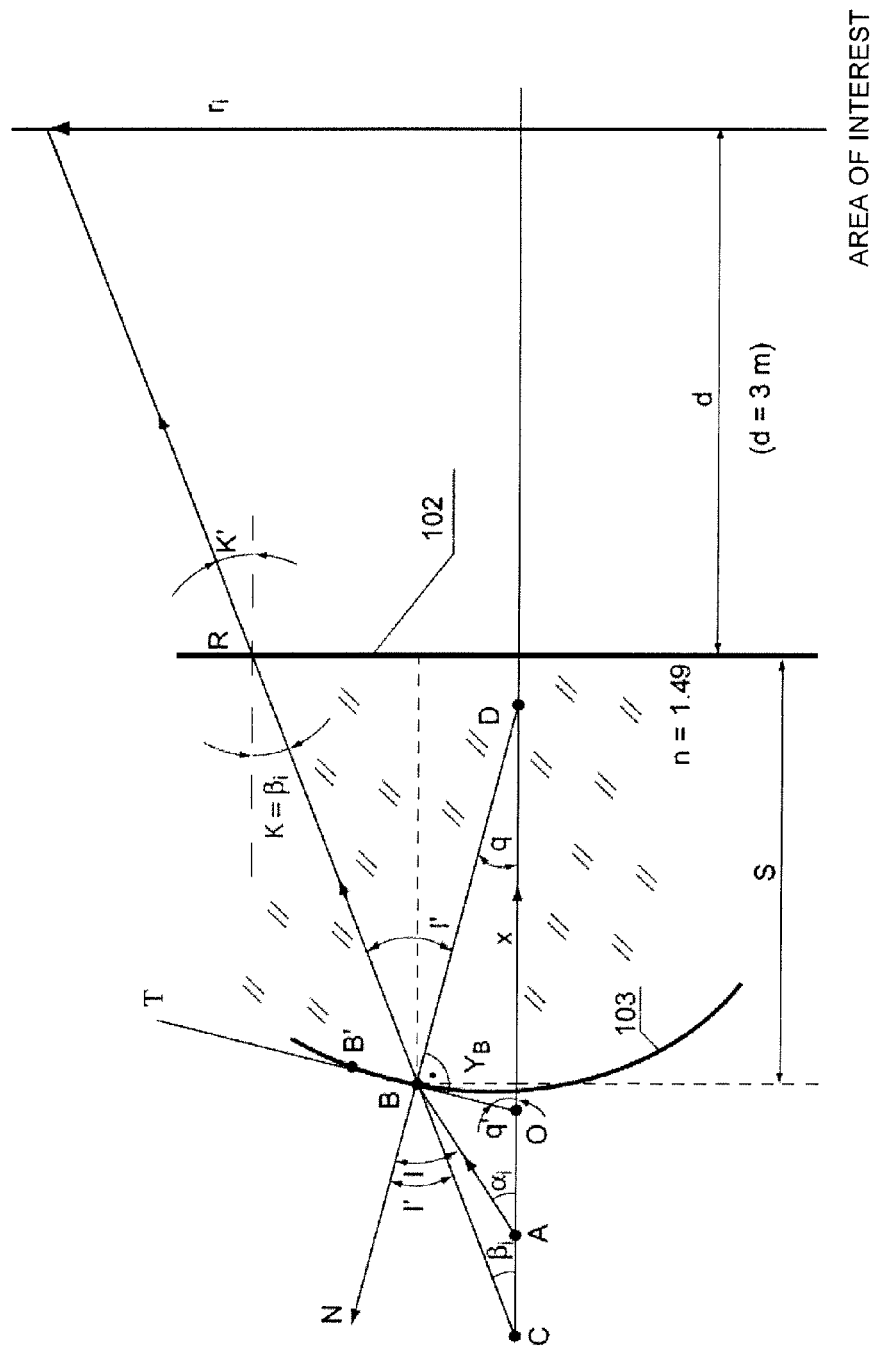
FIG. 15 illustrates the main geometry of a transformation process in accordance with one embodiment of the invention.
Figure 16:
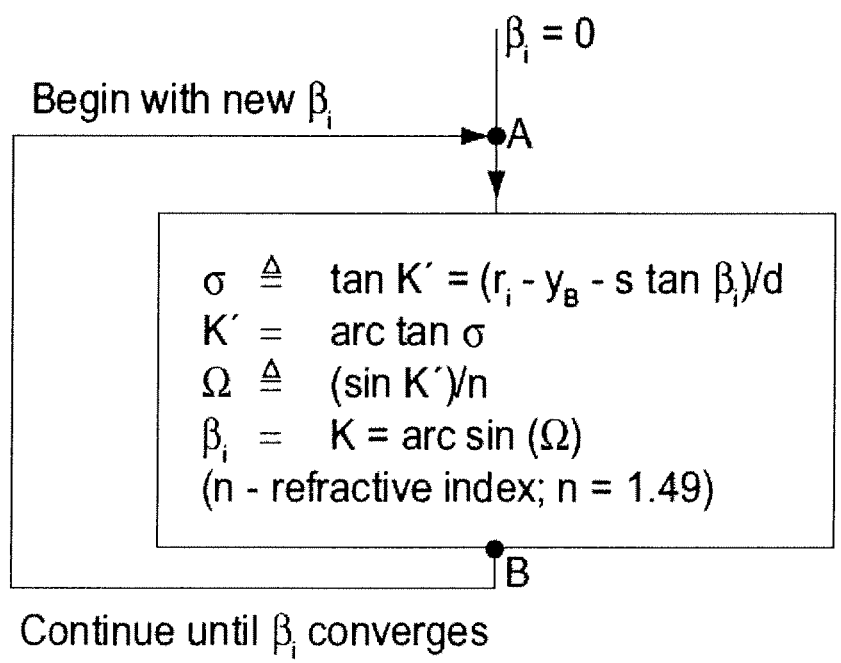
FIG. 16 is a flow diagram illustrating a process for finding $\beta_i$ in accordance with one embodiment of the invention.

FIG. 15 illustrates the main geometry of a transformation process in accordance with one embodiment of the invention. FIG. 16 is a flow diagram illustrating a process for finding $\beta_i$ in accordance with one embodiment of the invention using a transformation table. Referring now to FIGS. 15 and 16, consider the case of designing the geometry of surface 103, step by step, with an increment in output angle $\Delta\alpha_i$ (in other words, $\alpha_{i+1}=\alpha_i+\Delta\alpha_i$). With this example, it is assumed that the surface 103 has already been designed up to point B. To accomplish the next step in designing surface 103, the process first finds the angle, q, between AO and the normal N to the surface, or the angle q' between line T, tangential to the surface at point B, and the axis. Then, the process takes a step along line T from point B to point B', adding an increment $\Delta\alpha_i$ to the LED output angle $\alpha_i$. The basic point is to define a profile of surface 103, such that for low angles $\alpha_i$, it satisfies the transformation pair ($\alpha_i$, $r_i$) as per the transformation table. The sequence of operations to find angle q' is illustrated in FIG. 16. For ray AB, refracted into ray BR, from Snell's law, n sin I' can be found as:

$$n \sin I' = \sin I, \text{ or } I' = \arcsin\left[\frac{\sin I}{n}\right]. \tag{37}$$

From triangle CAB:

$$\beta_i+(180°\alpha\alpha_i)+(I-I')=180°, \text{ or}$$

$$\beta_i-\alpha_i=I'-I, \text{ or } \alpha_i-\beta_i=I-I'. \tag{38}$$

From triangle CDB:

$$\beta_i+q+(180°-I')=180°, \text{ or } I'=q+\beta_i. \tag{39}$$

Eliminating I' from Eqs. (38) and (39), yields:

$$q+\beta_i=I+\beta_i-\alpha_i, \text{ or } q=I-\alpha_i, \text{ and } q'=90°-q. \tag{40}$$

The angle I can be found from non-linear Eq. (38), by using Eq. (37), in the form:

$$I-\arcsin\left[\frac{\sin I}{n}\right]=\alpha_i-\beta_i. \tag{41}$$

where angle $\beta_i$ can be found from an iterative process such as that shown in Eqs. (42) and (43) and in FIG. 16.

If angle I is known from Eq. (41), then angles q and q' can be derived from Eq. (40). With q', the process continues, step by step, along tangential line T (FIG. 15), wherein the angle $\alpha_{i+1}$ is analyzed at a new point B' on line T, and the position where $\alpha_{i+1}-\alpha_i=\Delta\alpha_i$ is determined.

Then, from point B', a new tangential line to surface 103 is determined. The refraction at point B' on surfaces 103, will target output rays from LED at angle $\alpha_{i+1}$ to the point on the floor with coordinate $r_{i+1}$. Using the algorithm shown in FIG. 16 and Eqs. (37)-(41), the design is repeated until the angle $\alpha$ reaches a value of 30°; or close to this value.

The algorithm, illustrated in FIG. 16, is constituted of the following equations $$\sigma=\tan K', \text{ and } K'=\arctan \sigma \tag{42}$$

From FIG. 15, we have:

$$r_i=y_B+\Delta \tan \beta_i+d \tan K' \tag{43}$$

assuming $\beta_i$=K, we obtain from Eqs. (42) and (43):

$$\sigma = \tan K' = \frac{(r_i - y_B - s\tan\beta_i)}{d}. \tag{44}$$

We also define:

$$\Omega=(\sin K), \text{ and } K=\arc \sin \Omega=\beta_i \tag{45}$$

also, from Snell's law:

$$\Omega=(\sin K')/n; n=1.49 \text{ as an example.} \tag{46}$$

As a result, we find surface 103 profile, in the form:

$$y=y(x) \tag{47}$$

as a curve revolution. Eq. (47) is an approximate solution of the deconvolution problem corresponding to the transformation pair ($\alpha_i$, $r_i$) look-up table. The solution is based on the assumption that skew rays can be ignored in the first approximation.

Figure 17:
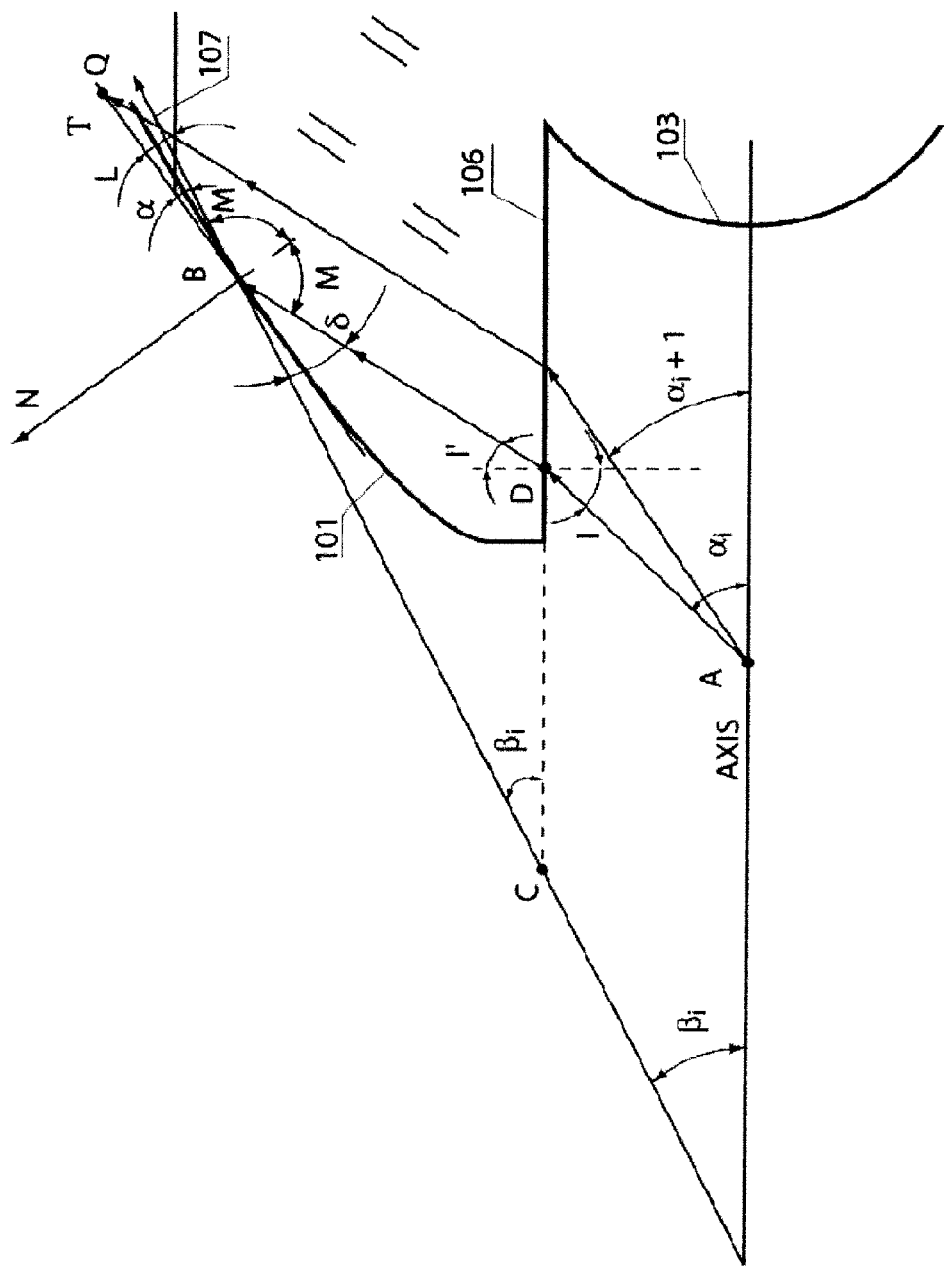
FIG. 17 is a diagram illustrating the generation of a surface in accordance with one embodiment of the invention.

FIG. 17 is a diagram illustrating the generation of a surface 101 in accordance with one embodiment of the invention. Referring now to FIG. 17, an process used to generate surface 101 is illustrated for high $\alpha_i$-angles. Then, the angle, L, of tangential line to the surface 101, at point B, is $$L=\gamma+\beta_i \tag{48}$$

where $\gamma$ is the angle between reflected ray 107 and tangential line T, and from the Law of Reflection:

$$\gamma=90°-M \tag{49}$$

where M is the angle between normal to surface 101, N, and incident (or reflected) ray, as shown in FIG. 17.

From FIG. 17, $$\delta=2M=180° \tag{50}$$

and, from triangle CDB:

$$\beta_i+90°+I'+\sigma=180°. \tag{51}$$

Substituting Eq. (50) into Eq. (51) yields:

$$\beta_i+90°+I'+(180°-2M)=180°, \text{ or} \tag{52}$$

$$M=(90°+I'+\beta_i)/2. \tag{53}$$

Figure 18:
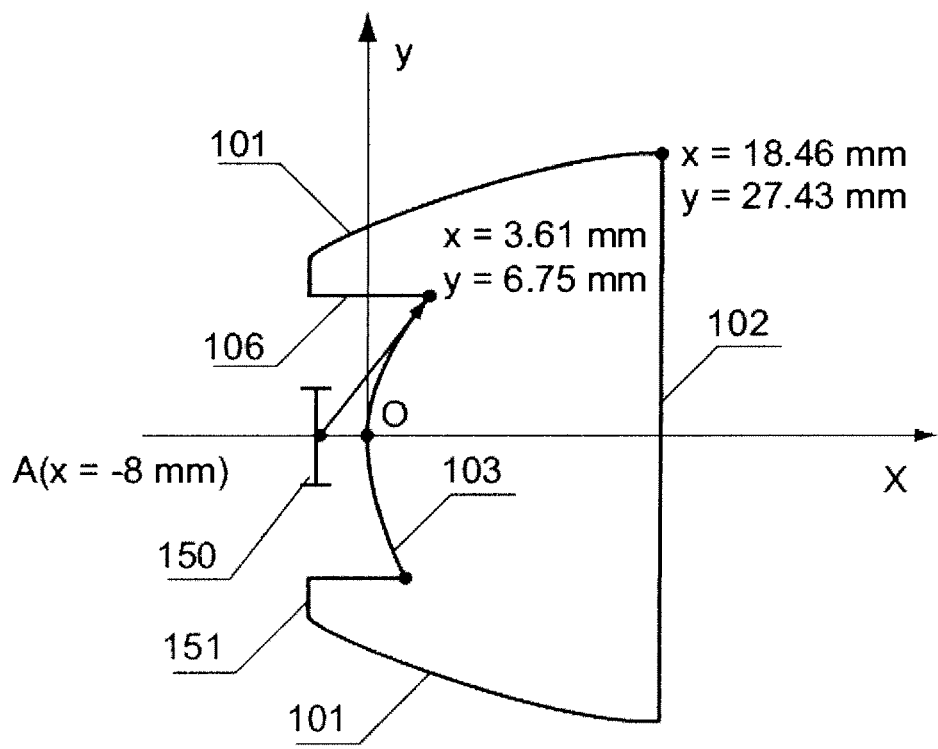
FIG. 18 is a diagram illustrating an example beam transformer in accordance with one embodiment of the invention.

After the angle L of the line tangential to surface 101 has been found, the next step over surface 101 is taken by ray-tracing rays with output angle $\alpha_{i+1}$ to an intersection with line T. This is point Q (within the infinitesimal translation) which will be the net point of surface 101, and the algorithm is repeated. FIG. 18 is a diagram illustrating the resultant beam transformer. Thus, the above description explains a design of an LED beam transformer for both low and high angles $\alpha_i$, with outline shown in FIG. 18, as an example.

Figure 19:
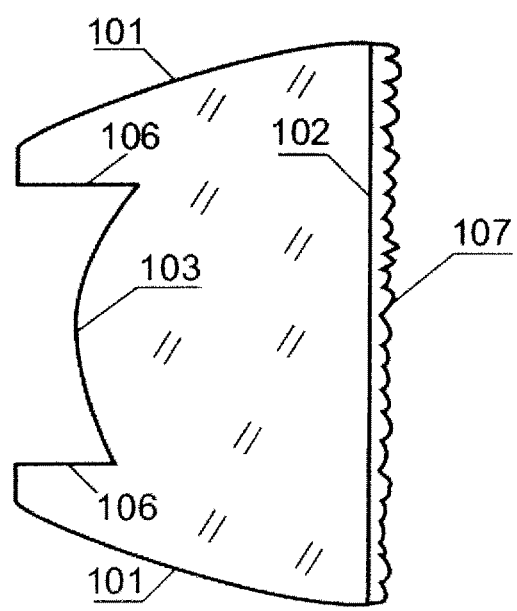
FIG. 19 is a diagram illustrating an example of a beam transformer with a diffuser included on the front surface in accordance with one embodiment of the invention.

Further beam transformer tailoring can be realized by including a diffuser front surface into the transformer. For example, a diffuser can be included with the above embodiments, as in FIGS. 10, 11, 12, 13, 14, and others. FIG. 19 is a diagram illustrating an example of a beam transformer with a diffuser included on the front surface. Particularly, the embodiment illustrated in FIG. 19 depicts the embodiment of transformer 100a, as in FIG. 10, with a diffuser at front surface 107.

Figure 20:
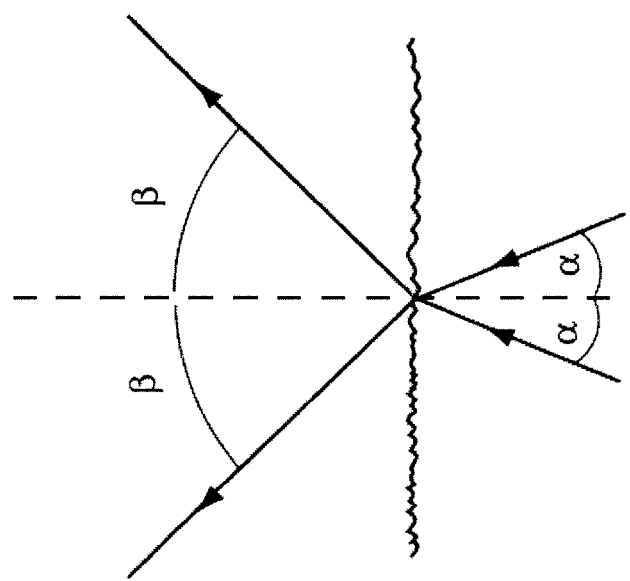
FIG. 20, illustrates example diffuser divergence angles, including: (a) collimated incident beam; and (b) divergent incident beam.
Figure 20:
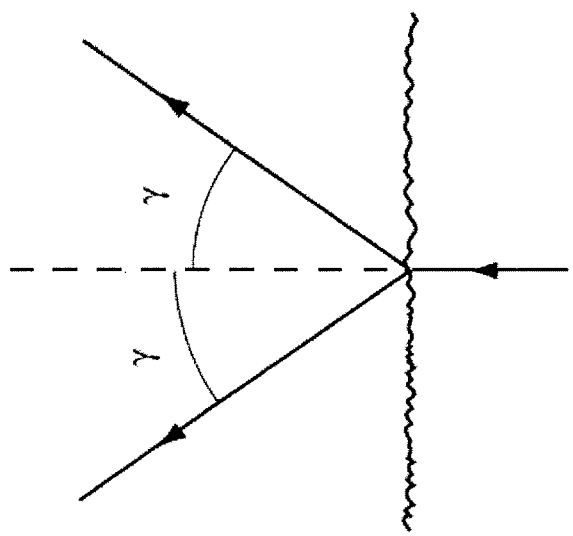

The performance of a diffuser with a tunable divergence angle has been described in detail in: T. Jannson, et al., "*Performance Metrics for Integrated Lighting Systems*", SPIE Proc., vol. 6225B-53, 2006. FIG. 20, which is FIG. 14 of this reference, illustrates diffuser divergence angles, including: (a) collimated incident beam; and (b) divergent incident beam. In FIG. 20 the collimated incident beam (left hand side of figure) is divergent by a diffuser with tunable Half-Width Half-Maximum (HWHM) angle α. The divergent incident beam, (right hand side of figure) with a HWHM angle of α is divergent by the same diffuser into a divergent beam with HWHM angle of β. For Gaussian (normal) distribution, these three angles satisfy the following relation:

$$\sin \beta = \sqrt{\sin^2 \alpha + \sin^2 \gamma}. \quad (54)$$

For real distributions, this relation can be treated as a good approximation. In general, this relation can be applied as guidance for Ca-angle adjustment for the diffuser. Ray-tracing programs have application options for rough surfaces (approximately, equivalent to diffusers) that can be traced on the fly. Accordingly, the transformer can be traced first, without the diffuser, up to the surface 102 and then, diffuser front surface 107 can be added. In such a case, diffuser reflection/absorption loss should also be included. This is discussed below.

In the case of embodiments where the front surface is aspheric with double curvature (such as the example illustrated in FIG. 12), a flexible diffuser layer can be problematic. In addition, in general, the standard diffuser coating flexible substrates can be unacceptable due to environmental (temperature, humidity) factors, especially for outdoor applications. In such cases, injection molding or other advanced techniques can be applied. In such a case, a proper mastering, such as electro-forming can be essential.

Figure 21:
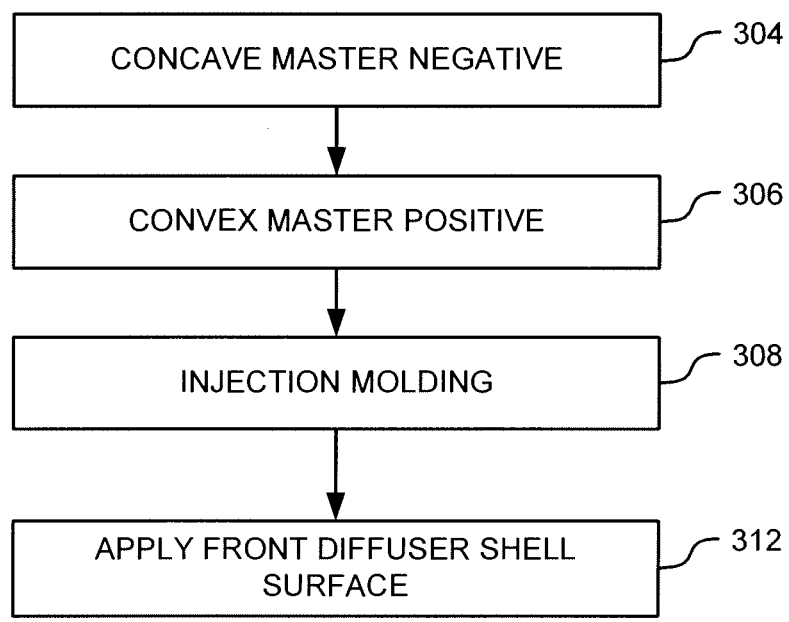
FIG. 21 is a diagram illustrating an example process for forming a transformer with a diffuser in accordance with one embodiment of the invention.

FIG. 21 is a diagram illustrating an example process for forming a transformer with a diffuser in accordance with one embodiment of the invention. Referring now to FIG. 21, in a step 304 a concave master negative is formed. In one embodiment, the concave master negative is created by an electro-forming process, or other metallic-conforming process. Such a method is appropriate for diffusers with HWHM angles up to 20° or even larger. It is noted that most casting processes use UV curing. These can be undesirable as they tend to overcure in use upon exposure to sunlight or other like sources. Accordingly, injection molding is a viable manufacturing approach. In addition, the transformer and diffuser can be separate elements or they can be made in a monolithic structure. Advantages of a monolithic structure include a one-step manufacturing process and the avoidance of elimination or separation of the two components.

In a step 306, a convex master positive is created. This can be developed using step 304, and is used as a metallic mold for the injection molding process. Then, in a step 308, the metallic mold shell is used for standard injection molding. In one embodiment, micro-molding is used with minimum resolution details in the range of 5-10 μm. Then, in a step 312, a molded acrylic front diffuser shell surface is applied. In one embodiment, such surface is coated as a shell front surface, as in FIG. 19.

As discussed above, the extended size of the LED source (which can be likened to a point-like extended source in some embodiments), and compactness of the beam transformer (manifested by a low (f/$r_{so}$)-ratio) creates singularities in the deconvolution process. This is manifested by a violation of the condition of Eq. (28); i.e., $r_{so} \Rightarrow f_o \ll \infty$.

Figure 22:
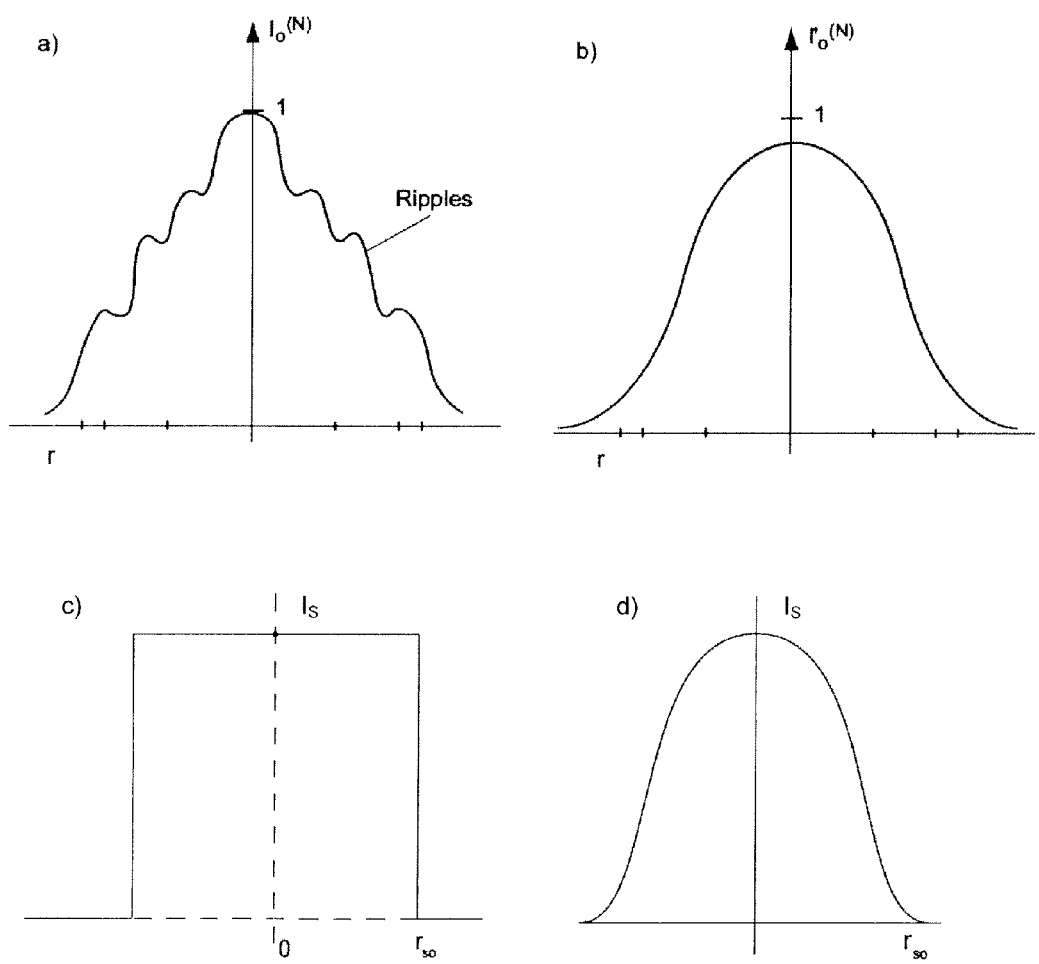
FIG. 22 is a diagram illustrating example output intensity patterns at a region of interest, including a) without a diffuser and b) with a diffuser; and the discontinuity of point-like extended sources, including the c) circ function and d) mitigated circ function after applying neutral attenuation filter.

As a result, the output intensity, $I_o(r)$, at the floor level, will have ripples that can be cancelled by diffuser front surface. FIG. 22 is a diagram illustrating output intensity patterns at the floor level, including without a diffuser 22(*a*); with a diffuser 22(*b*); and the discontinuity of point-like extended sources, including the circ function 22(*c*) and mitigated circ function 22(*d*) after applying neutral attenuation filter. In FIG. 22(*a*), the normalized output intensity at the floor level, $I_o^{(N)}(r)$, is shown, after the proposed process, with ripples, caused by the nature of deconvolution process, applied to point-like extended LED source. Such a source has a circ function intensity distribution, which has a discontinuity at $r_s = r_{so}$, as shown in FIG. 22(*c*). To avoid singularities caused by the edges in FIG. 22(*c*), the edges can be smoothed. This discontinuity can be cancelled by applying a neutral absorption filter with tunable optical density, imposing attenuation of intensity at the source edges, as shown in FIG. 22(*d*). In other words, the intensity of the LED source can be decreased as a function of the radius from center. Such a method, however, can provide energy losses and create extra heat spots. A more practical method has been shown in FIG. 22(*b*), where the ripples have been cancelled due to the inclusion of the diffuser at the front surface.

The systems and methods described herein can be used with various LED sources including compound LED sources made up of a large number of individual elementary LED sources combined in a single housing. Such LED sources are compound with extended sizes, $r_{so}$, in comparison to the luminaire sizes (characterized by focal length, f), and to the distance, d, to a floor or other surface of interest.

This is emphasized by the large rescaled size of the source, which is, in one example case, equal to approximately 250 mm (see Eq. (20)). For this example, the characteristic frequency $f_o$, which is equal to:

$$f_O = \frac{0.61}{250} /mm.$$

This is comparable to the cutoff frequency $f_1 = 1/750$ l/mm, as shown in FIG. 6. Therefore, indeed, in practical applications, extended sizes of the compound LED sources can be included in luminaire designs in accordance with the systems and methods described herein.

One technique for characterizing LED luminaires as compared with conventional technologies is to examine their power budget. In general, the power efficiency, $\eta_o$, of the LED luminaire is a product of electro-optic efficiency, $\eta_E$, and optical efficiency, $\eta_{OPT}$:

$$\eta_o = \eta_E \cdot \eta_{OPT} \quad (55)$$

where $\eta_o$ is the overall efficiency (in %). The electro-optic efficiency is a well-known figure, describing the fraction of total power, in electric Watts ($W_{el}$), that is transformed into optical power, in optical Watts ($W_{opt}$). This can also be described in terms of optical efficacy as opposed to efficiency when looking at output in lumens (lm). Efficacy, as opposed to efficiency, refers to the light output in lumens (luminous flux) produced by a light source relative to the amount of energy (typically in watts) used to produce that light. Efficiency, on the other hand, is a dimensionless ratio of output relative to input—i.e., watts out versus watts in.

Typically, for LEDs, $\eta_E = 25$-50 μm/W, and, for incandescent (tungsten-halogen) lamps, $\eta_E = 15$-25 μm/W. These are current (2008) data (according to: W. J. Cassady, "*High*

*Brightness LEDs, Optics and photonics News,"* p. 9, January 2008). The optical efficiency, $\eta_{OPT}$, is a product of three factors:

$$\eta_{OPT} = \eta_{FRESNEL} \cdot \eta_{ABSORPTION} \cdot \eta_{RC} \quad (56)$$

where $\eta_{FRESNEL}$ (or $\eta_{FR}$) is the efficiency characterizing Fresnel loss, $\eta_{ABSORPTION}$ (or $\eta_{AB}$) is the efficiency characterizing material absorption, and $\eta_{RC}$ is the efficiency characterizing the optical design losses. Such losses captured by $\eta_{RC}$ could be related, for example, to optical leakage (or from ray count (RC)) related to light not properly directed by total internal reflection or to some other lost light that is not transformed or redirected to proper light illumination at the surface of interest. These factors are discussed in more detail below.

The Fresnel loss is related to Fresnel reflection that occurs at interfaces of the beam transformer. For example, in terms of the above-described example embodiments, this can be at interfaces such as the air-transformer interfaces at surfaces 103 and 102 in example beam transformer 100a of FIG. 10. Typical values of the Fresnel reflection coefficient at an air-plastic interface is about 4%. Accordingly, for embodiments having two interfaces, an entrance and exit interface, the Fresnel efficiency is:

$$\eta_{FR} = (0.96)(0.96) = 0.92. \quad (57)$$

The absorption loss can be very low for glass (in dB/km), but it can be reasonably higher for plastics (e.g., ~1 dB/m). In such a case, scaling the loss to expected dimensions, it can be described as being on the order of 0.1 dB/10 cm. For embodiments made using plastics and assuming a luminaire length of 10 cm (typically, it is shorter), absorption losses will be expected on the order of:

$$\eta_{AB} = 0.975. \quad (58)$$

Now, assuming the optical design loss of 10%, this yields:

$$\eta_{RC} = 0.9. \quad (59)$$

Inserting these values into Eq. (56) shows that the optical efficiency value for example embodiments meeting these criteria, is $$\eta_{OPT} = (0.92)(0.975)(0.9) = 0.81. \quad (60)$$

It is instructive to compare this value with that for conventional luminaire technologies. Where conventional luminaires include 2 interfaces, the value of $\eta_{FR}$ is the same. However, for conventional luminaires made from glass, material absorption is very low; so, it can be assumed to be $\eta_{AB} = 100\%$. The estimation of an $\eta_{RC}$ value is difficult to estimate because no effective luminaire is used for typical incandescent sources; thus, homogeneity of incandescent lighting at the floor should be measured experimentally; in a similar way as the homogeneity of LED lighting is measured. However, in preferred embodiments as described herein the luminaire is configured to provide a more direct illumination with a limited field of view to avoid the dazzling effect. This, in turn, introduces additional constraints that impact and lead to a limited value of $\eta_{RC}$ for the LED. However, the efficiency value for the LED is usually higher than that for the incandescent lighting, with typical ratio value of:

$$\frac{\eta_E^{(LED)}}{\eta_E^{(INCAND.)}} = \frac{37.5}{20} = 1.9 \quad (61)$$

where the above current literature data (25-50 μm/W for LEDs and 15-25 μm/W for classical sources) has been used. Therefore, the overall figures of $\eta_o$ should be comparable for both cases.

The power budget estimation is useful for evaluating power transfer. In many lighting applications, however, the transfer of other photometric (radiometric) quantities is also useful to be determined. These other photometric quantities can include, for example brightness (luminance), radiant intensity (luminant intensity), intensity (illuminance), etc. Those quantities are connected not only with the 1st Principle of Thermodynamics but also with the 2nd Principle of Thermodynamics. This subject is discussed, in detail, in: T. Jannson, et al., *"Brightness Limitations in Integrated Lighting Systems,"* SPIE Proc., vol. 6558-21, 2007.

Figure 23:
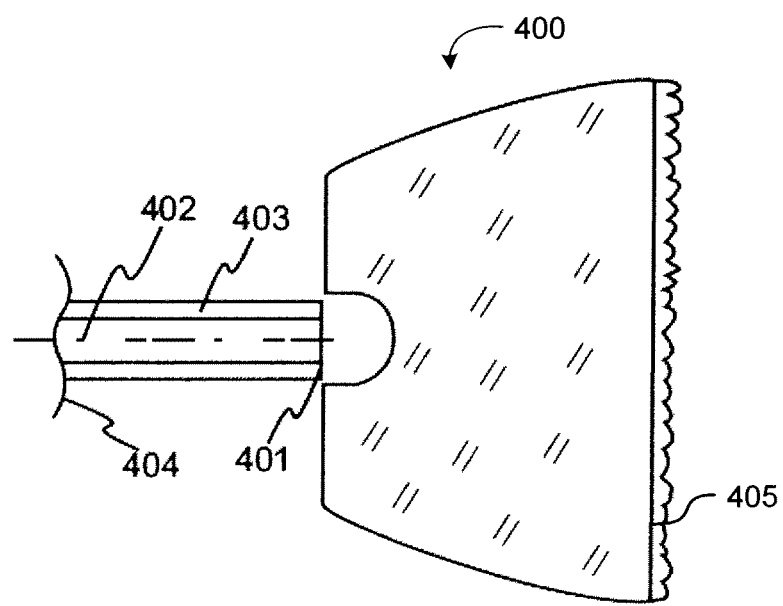
FIG. 23 is a diagram illustrating yet another example of a beam transformer in accordance with one embodiment of the invention.

FIG. 23 is a diagram illustrating yet another example of a beam transformer in accordance with one embodiment of the invention. The example embodiment depicted in FIG. 23 comprises a transformer 400 similar to transformer 100a as illustrated in the example of FIG. 10, but with a diffuser 405 at the exit surface. This example also illustrates an interface for a laser light source. In this embodiment illustrated in FIG. 23, the point-like extended LED front surface area 150 that was in the embodiment of FIG. 10 is replaced by a fiber front area 401. This example includes a multi-mode (or, single-mode) fiber 404, including a fiber core 402 and its cladding/cover 403. In one embodiment fiber 404 has core diameter in the range from 60 μm to 1 mm, the latter value typical for medical fibers that deliver a laser light for medical treatment. Therefore, the fiber front area constitutes a kind of point-like extended light source, very similar to LED source, used in the five (5) embodiments described with reference to FIGS. 10, 11, 12, 13, and 14. The angular distribution is defined by the fiber's numerical aperture (NA), which, for multi-mode fibers, is typically in the range of 0.3-0.45. Because the NA=sin α, where α is output half-angle in air; for a NA=0.3, α=30°. The fiber's output angular distribution should be included in the laser source design, as in the case of the example LED-based embodiments described above. The multi-mode laser light delivery fiber can be replaced by single-mode fiber if the NA is increased such as, for example by a lens system.

Figure 24:
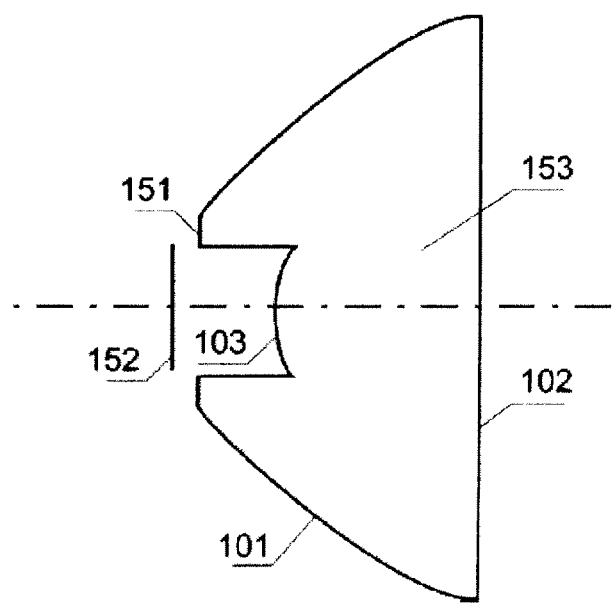
FIG. 24 is an illustration of a modified LED embodiment that is used herein as an exemplary reference used with ray-tracing to illustrate the differences in luminaire performance with and without a diffuser.

As described to some extent above with reference to FIG. 22, the use of a diffuser with the luminare can extend the tolerance of the luminaire assembly. FIG. 24 is an illustration of a modified LED embodiment that is used herein as an exemplary reference that is used with ray-tracing to illustrate the differences in luminaire performance with and without a diffuser. In FIG. 24, the example is similar to the example LED embodiment as illustrated in FIG. 10, but with a point-like extended LED surface 152 displaced from the plane defined by the surfaces 151. This is in contrast to the embodiments of FIGS. 10, 11, 12, 13, and 14, wherein the source 151 is disposed roughly in the same plane as defined by the surfaces 151. The example of FIG. 24 includes an entrance surface 103, and exit surface 102 and an internal reflection surface 101.

Figure 25:
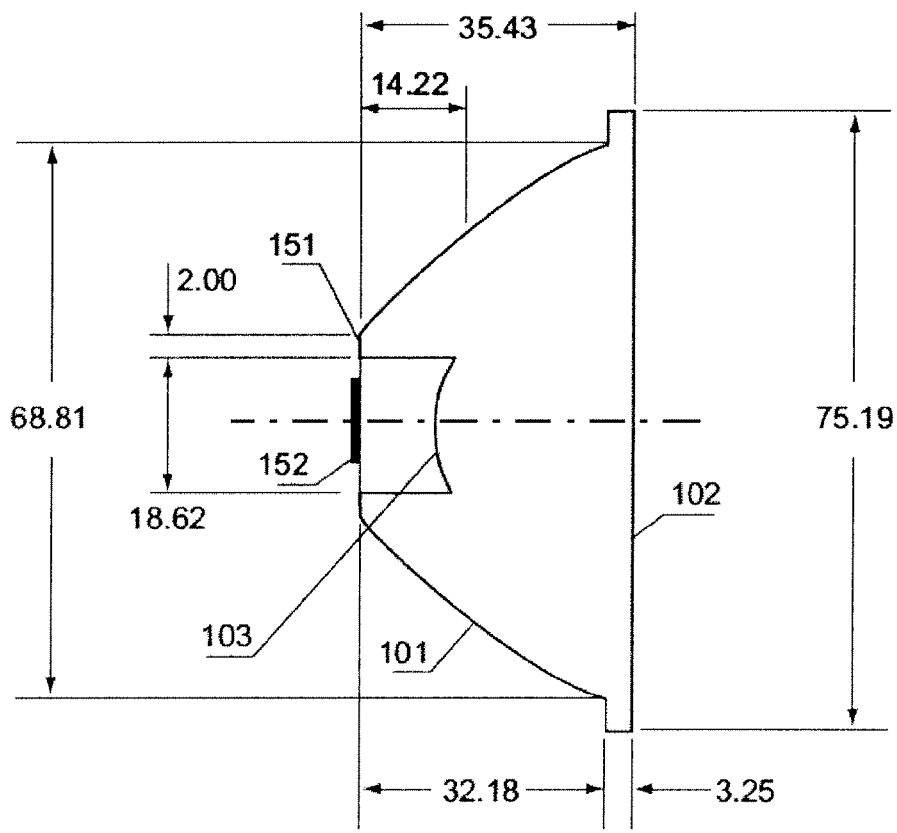
FIG. 25 is a diagram illustrating an LED embodiment similar to that as depicted in FIG. 24, but with characteristic dimensions being provided (in millimeters) as an example that is used for ray-tracing.
Figure 26:
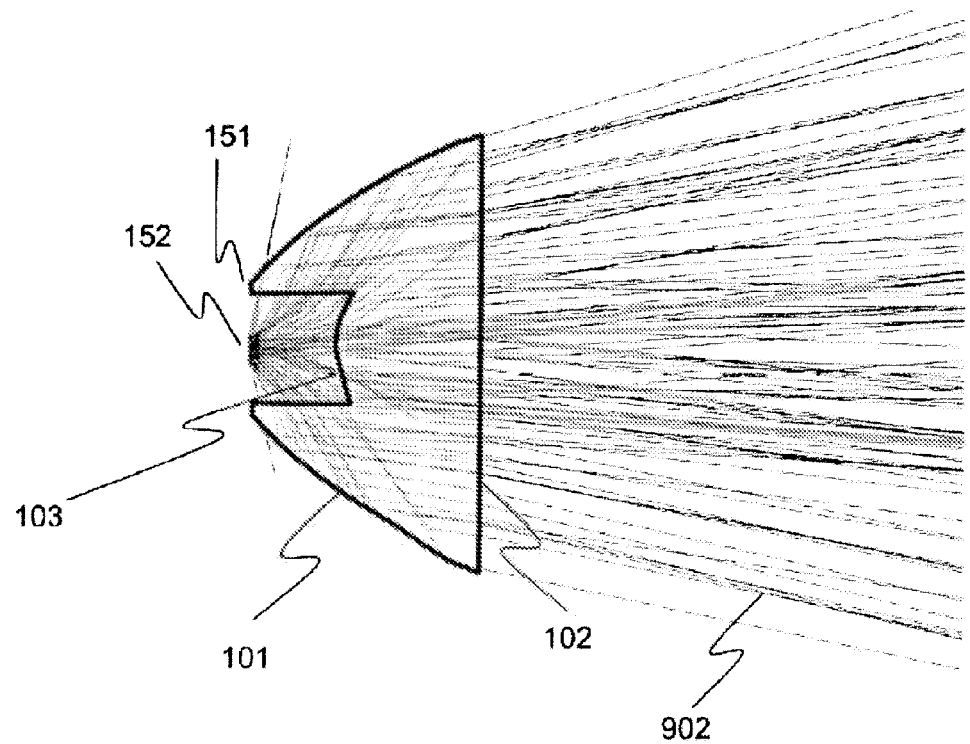
FIG. 26, is a diagram illustrating a ray-tracing example excluding Fresnel reflection.

FIG. 25 is a diagram illustrating an LED embodiment similar to that as depicted in FIG. 24, but with the important characteristic dimensions being provided (in millimeters) as an example that can is used for ray-tracing. This example is used with ray tracing to examine the performance of the luminaire with and without a diffuser. Examples of this are depicted in FIGS. 26-30. Particularly, the ray-tracing for this example embodiment is shown in FIG. 26, excluding Fresnel reflection, where the surface 101 is the reflection surface.

Because surfaces 151, 152, 101, 102, 103 are assumed to be surfaces of revolution in accordance with preferred embodiments, only central rays are shown, for simplicity.

Figure 27:
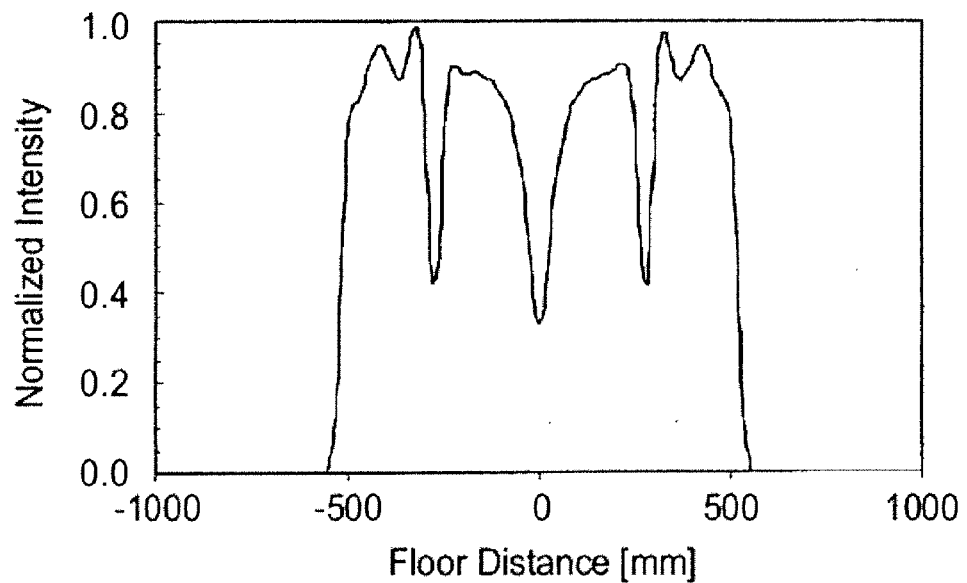
FIG. 27 is a diagram illustrating an example of the normalized intensity distribution at the plane of the region of interest for the point source placed in the center of the surface.
Figure 28:
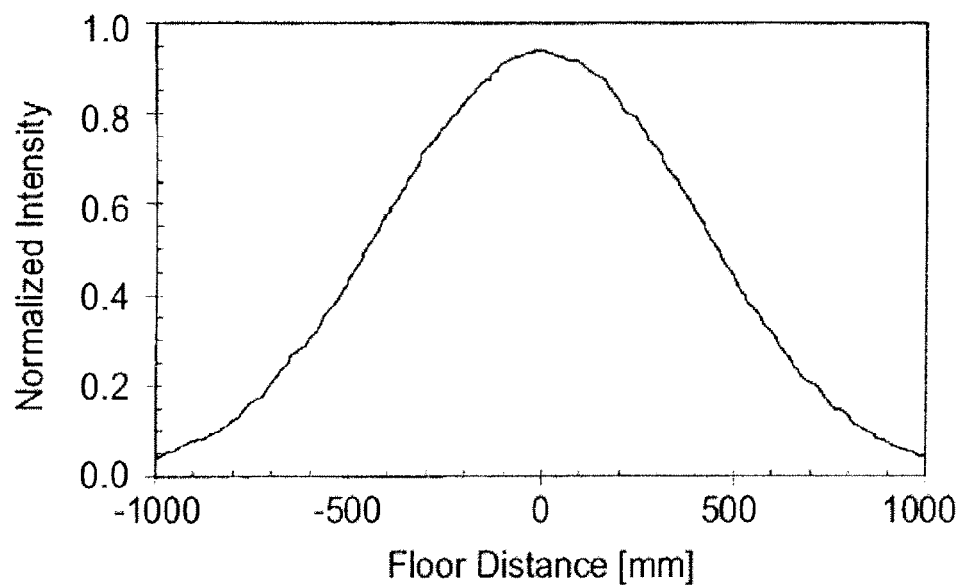
FIG. 28 is a diagram illustrating an example of analogous intensity distribution for an example embodiment with a diffuser.

FIG. 27 is a diagram illustrating an example of the normalized intensity distribution at the plane of the region of interest for the point source placed in the center of the surface 152 is shown in FIG. 27. In this example, distances, in mm, are obtained from ray-tracing and the heavy intensity non-homogeneities are shown. The analogous intensity distribution for the embodiment with a diffuser 154 is shown in FIG. 28. In this illustration, it can be seen that inhomogeneities have been eliminated as a result of the inclusion of the diffuser.

Figure 29:
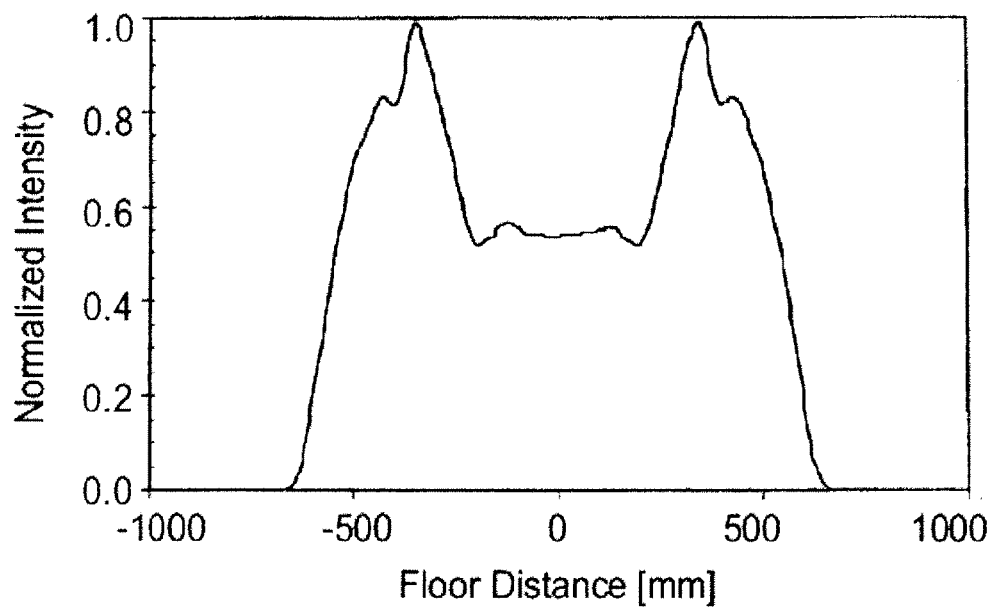
FIG. 29 is a diagram illustrating an example of a normalized intensity distribution at the plane of a region of interest for a point-like extended LED source of 4 mm×4 mm, without a diffuser.

FIG. 29 shows the normalized intensity distribution at the plane of the region of interest for a point-like extended LED source of 4 mm×4 mm, without a diffuser. This shows that there is an undesirable dip at the center of this distribution.

Figure 30:
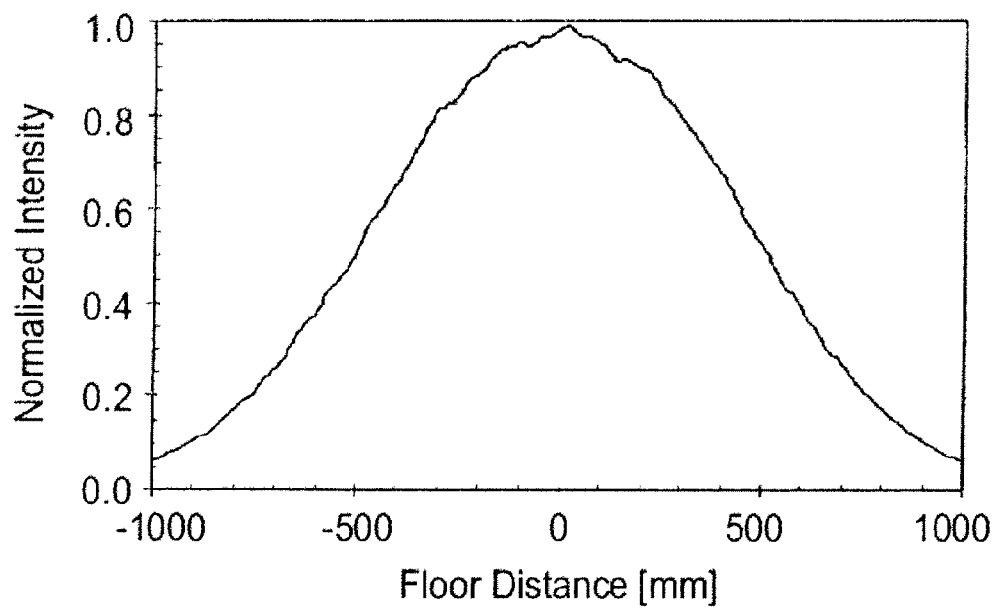
FIG. 30 is a diagram illustrating an example of intensity distribution for the extended (4×4 mm) LED source, but for embodiments with a diffuser.

FIG. 30 illustrates the intensity distribution for the extended (4×4 mm) LED source, but for embodiments 154 with a diffuser. As this example illustrates, the non-uniformity at the center has been eliminated. In summary, the adding diffuser random front surfaces extremely helps to avoid the inhomogenities of the intensity distribution at the floor plane. In FIGS. 28 and 30, the applied diffuser has been a strong one (i.e., zero-beam has been eliminated), and its FWHM was over 30°.

Figure 31:
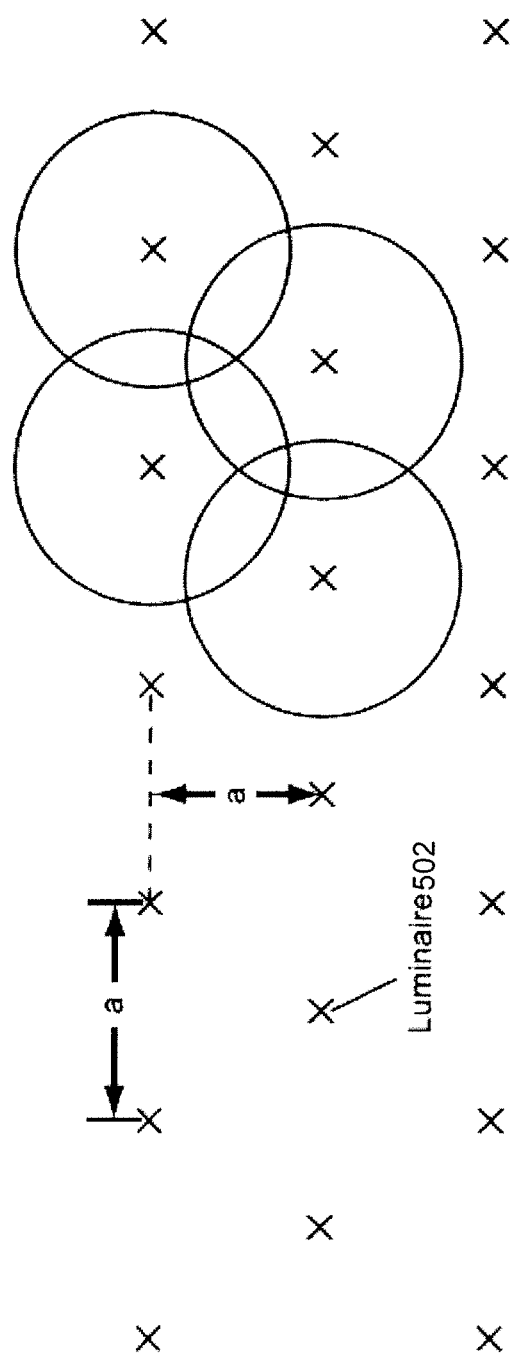
FIG. 31 is a diagram illustrating illumination of a rectangular region of interest in accordance with one embodiment of the invention, where the illuminated spot size is equal to the distance, α, between luminaires.

In order to illuminate an area, or region of interest such as at the floor level or work-surface level, an array of LED luminaires 502 can be applied in an array. Any of a variety of arrays can be used. For example, a hexagonal or offset array, as shown in FIG. 31 can be used. Such arrangement as in FIG. 31, illuminates evenly a rectangular region of interest, where the illuminated spot size is equal to the distance, a, between luminaires. The process can begin by characterizing the output intensity of a single extended source, identifying a beamformer to create an appropriate pattern at the region of interest, and defining the array pattern and placement based on that pattern. Alternatively, the process can lay out the array pattern and then, based on the sources, configure the beamformer to arrive at the appropriate pattern in the region of interest to provide the desired area of coverage.

In order to obtain highly homogenous illumination, the intensity, $I_o(r)$, in Eq. (15) should have the following form:

$$I_O(r) = I_m e^{\frac{-r^2}{(0.4a^2)}} \quad (62)$$

Figure 32:
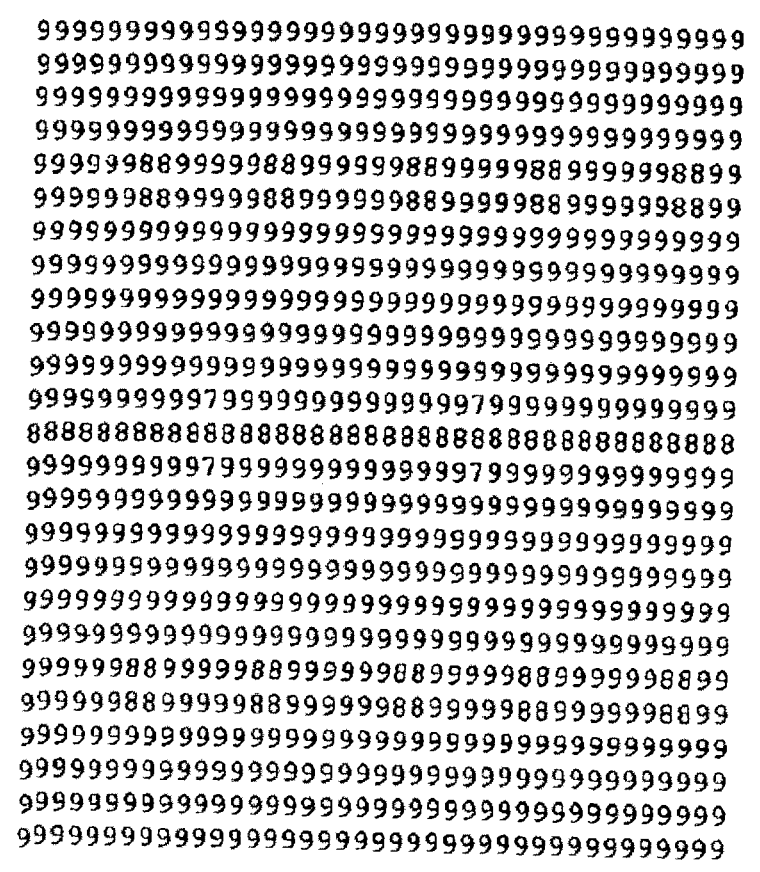

The quality of an example illumination pattern for a=0.75 m is shown in FIG. 32, where the intensity is divided on 10 dynamic levels, and the table step is 0.1 m. For the example illustrated in FIG. 32, this is a non-ideal application. In this example, the distribution of dynamic levels across the area of illumination is a fairly strong distribution of nines, with a few places where the dynamic level is at an 8 or a 7. Note however that the row crossing the center of the pattern indicates a pattern of non-uniformity. Particularly, in this example, this center row has a fairly consistent pattern of eights across the row. This can be introduced, for example, where there is a configuration of 2 rows of luminaires and a greater amount of spacing between the 2 rows. Where spacing is narrower and a higher level of overlap is achieved, a more uniform pattern might be realized. Accordingly, a closer packed layout such as, for example, the one shown in FIG. 31, might provide more uniform results.

As these examples illustrate, the placement and density of the luminaires in an array can affect uniformity of the resultant light pattern at the area of interest. As these examples also illustrate, architectural details in an application environment that might impact flexibility in placement of the luminaires in the array can have an impact on uniformity of the resultant light pattern. In some embodiments, an anamorphic or non-uniform beam former can be used to alter the distribution of light to account for non-uniform spacing. For example, the source-specific angular distribution tables can be used to define a pattern that accounts for luminaire placement.

Figure 33:
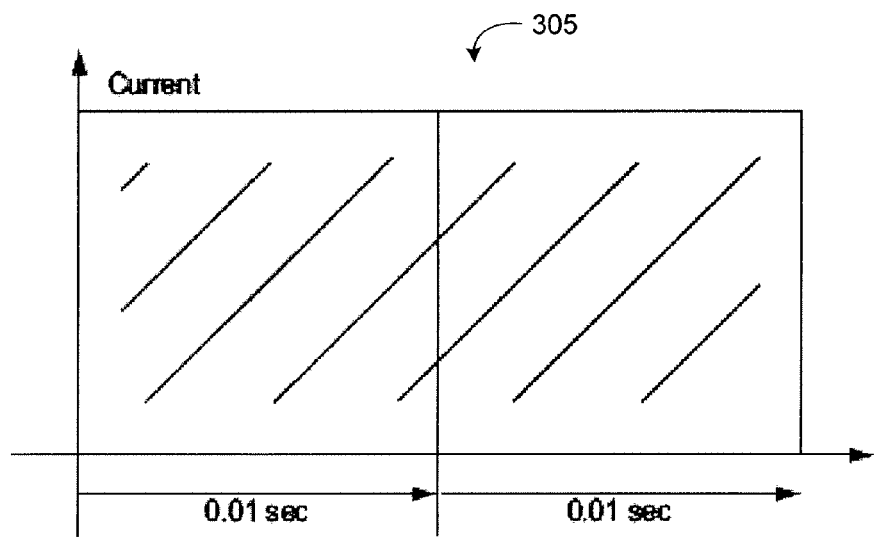
FIG. 33 is a diagram illustrating a simple example of pulse-width modulation to control light output from an LED source in accordance with one embodiment of the invention.
Figure 33:
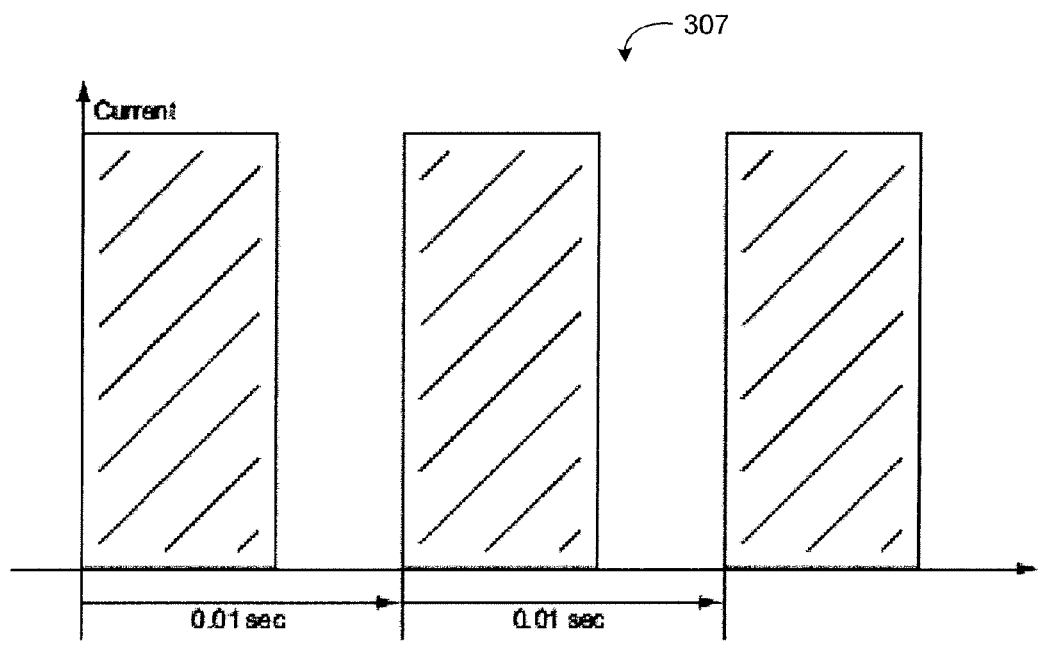

In various embodiments, driving electronics with that provide a variable duty cycle can be included. Such embodiments can help to obtain dazzle-free LED illumination. In general, LED light sources have a non-linear response to a driving current. When driving current is reduced, an LED responds with a reduced light output in a non-linear fashion. Moreover, LEDs tend to respond to reduced current down to a certain point, below which light output drops to zero. Accordingly, illumination control based on current driving alone can be difficult to achieve with accuracy. Additionally, when LEDs are exposed to a large number of cycles below this threshold, these "no-return" passes can reduce and LED's lifetime significantly. Accordingly, for efficient dimming or brightness control, a method of pulse-width modulation can be used to control both the duty cycle and to reduce or minimize driving currents below the no-return threshold. FIG. 33 is a diagram illustrating a simple example of pulse-width modulation to control light output from an LED source. In this example, 305 illustrates a 100% duty cycle at a given current level, whereas 307 illustrates a 50% duty cycle. When a 50% duty cycle is applied, as in 307, for example, the LED light output is approximately ½ value of the 100% duty cycle.

Figure 34:
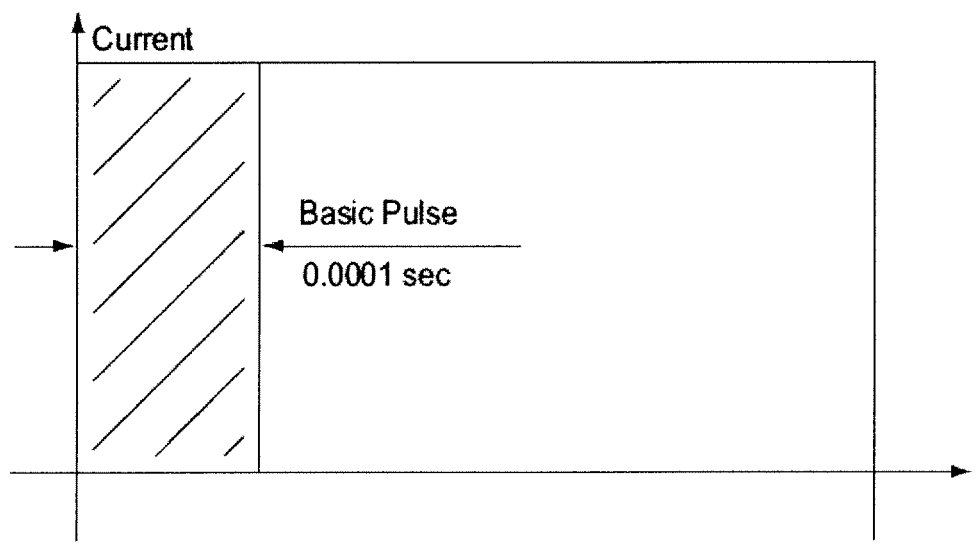
FIG. 34 is a diagram illustrating an example of dimming with dynamic resolution of $100^{th}$ of maximum intensity using basic pulses of 106 Hz, or 10 kHz, in accordance with one embodiment of the invention.

Because the human eye can be sensitive to fluctuations in light output at low frequencies, it is preferable that the frequency of the pulse-width modulated stream remain high. In one embodiment, the frequency of pulses exceeds 100 Hz to make the fluctuations undistinguishable for an observer. Accordingly, the dimming with dynamic resolution of $100^{th}$ of maximum intensity can be achieved by using the basic pulses of 104 Hz, or 10 kHz, as shown in FIG. 34.

Figure 35:
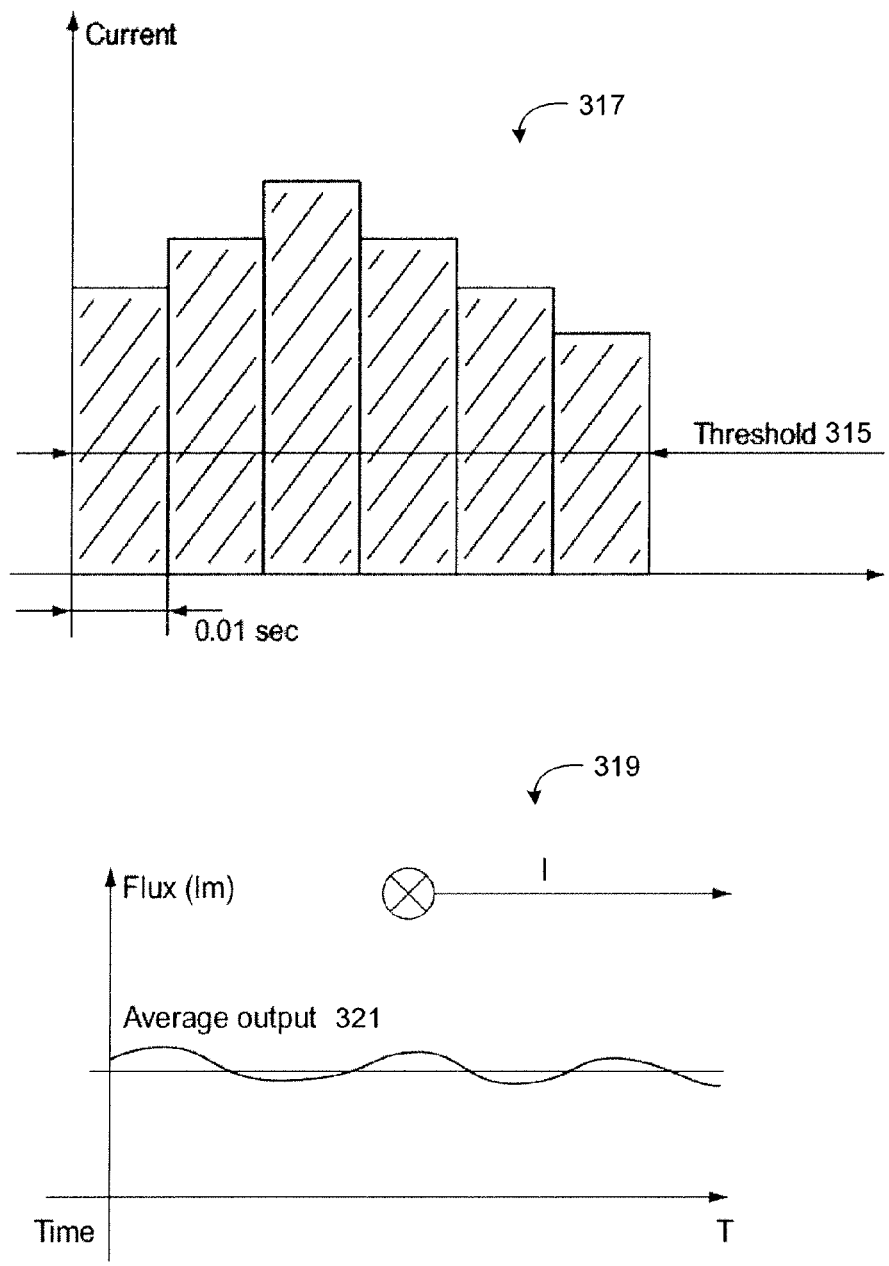
FIG. 35 illustrates a scenario where output is modulated due to a shaped pulse while the average output remains relatively or almost constant in accordance with one embodiment of the invention.

It is well known that the sound and visual stimuli can affect brain wave activity as a result of switching between alpha, beta, and theta rhythms. Accordingly, some embodiments can be implemented in a manner so as to facilitate the accomplishment of different tasks or environments, such as: preparation for stressful situations; improved learning environments; meditation; relaxation and so on. In order to induce a change in brain wave activity by applying visual stimulus, certain frequencies can be used. For example, this can include frequency pulses such as 8-13 Hz alpha rhythms or low frequency theta rhythm pulses. Such activity can be accomplished by modulating the drive current on LED-based illumination sources. To generate the pulses with low frequencies on the order of 0-30 Hz, a higher frequency signal such as, for example, pulses with a 100 Hz standard frequency can be used. Moreover, such pulses can be re-shaped to further increase the efficiency of brain wave stimulation. FIG. 35 illustrates a scenario where output is modulated due to a shaped pulse while the average output remains relatively or almost constant. Referring to FIG. 35, although a standard 100 Hz is applied, we can create a lower frequency by shaped-pulse modulation 317 above the "no-return" threshold 315, as in the left half of FIG. 35, while the average output 321 still can be almost constant as shown at 319.

Figure 36:
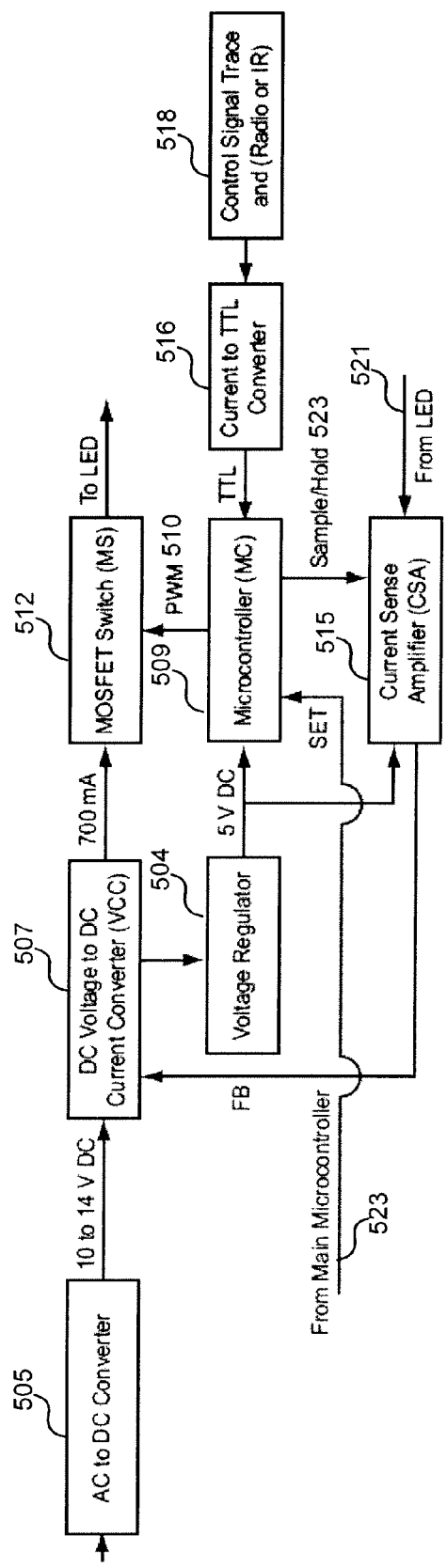
FIG. 36 is a diagram illustrating an example scheme of an LED driver where a MOSFET switch is used as the high-current driver in accordance with one embodiment of the invention.

The desired characteristics of the pulse-width modulation can be controlled by a microcontroller, which can be implemented to minimize the number of "no-return" passes; thus, improving the LED's lifetime. One property to be considered in the design of pulse-width modulation schemes is that a current going through an LED is defined at an optimal level for the specific LED chosen. Accordingly, the driver circuit should have a closed-loop width feedback to a current source to achieve this optimal value, because each LED has an specified internal resistance. Without a microcontroller, when a current is interrupted, the closed-loop feedback would push the current source to increase output, and at the beginning of the next pulse, the current will become very large. This could reduce the lifetime of the LED. To stabilize the current at the initial moment of a pulse, a digital sample hold of the feedback signal can be included. Therefore, the microcontroller is preferably configured in such a way that it will drive the pulse sequence, and, at the same time, it will provide a sample-hold protection. The scheme of such a LED driver is shown in FIG. 36, where a MOSFET switch is used as the high-current driver. Referring now to the example illustrated in FIG. 36, An AC/DC power converter receives input AC power such as, for example, 110-120V, 60 Hz, AC Mains and converts it to a 10-14V DC output. A DC-voltage-to-DC-current converter 507 receives the DC power from AC-DC power converter 505 and adjusts the voltage to send a 700 mA current to the LED through the MOSFET switch 512. DC-voltage-to-DC-current converter 507 also provides an output to voltage regulator 504, which is used to provide a 5V DC power to microcontroller 509. The microcontroller 509 receives the current pulse-width-modulation data 523 from the main microcontroller and uses this to generate the PWM signal 510 to drive MOSFET switch 512.

The voltage adjustment illustrated in this example is a closed-loop system with the LED. It operates through the current-sense amplifier 515, which receives the feedback signal 521 from the LED. When the LED is "off," the microcontroller 509 sends a sample/hold signal 523 to the current-sense amplifier 515. The current-sense amplifier 515 provides feedback to the DC-voltage-to-DC-current converter 507, so that DC-voltage-to-DC-current converter 507 does not raise the voltage, thereby keeping it as required for the particular LED. When the LED is "on" again, the cycle begins with the correct above-threshold voltage. Accordingly, under these conditions of stabilized voltage during pulse width modulation, the no-return condition can be avoided, thereby improving the lifetime of LEDs. Additionally, a small amplitude modulation output can be overlapped with luminaire output to further enhance the human experience.

Figure 37:
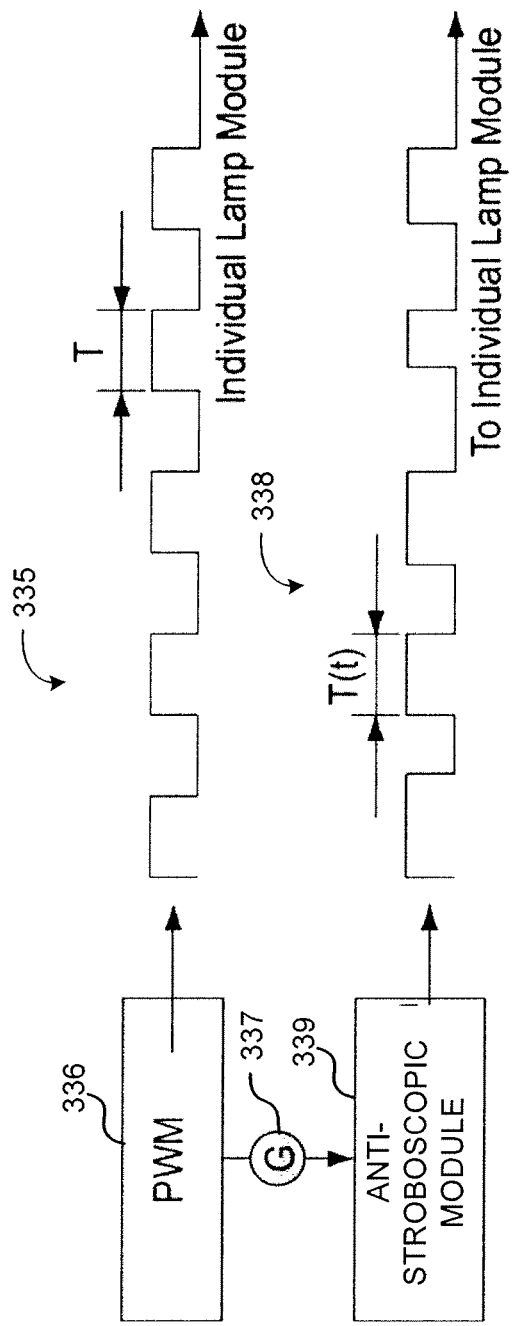
FIG. 37 is a diagram illustrating an example of applying pulse-width modulation in accordance with one embodiment of the invention.

In the above electronics designs, it is assumed that there is a synchronized response of LED compound sources. This could create a further undesirable effect, which however, can be insufficient in the case of luminaires with dominating LED lighting, as in various embodiments described herein. Therefore, embodiments can include techniques for pulse-desynchronization, which can be based, for example, on phase, $\phi$, and period, T, modulation. For example, an anti-stroboscopic jitter generator or anti-stroboscopic desynchronization mechanism can be implemented. FIG. 37 is a diagram illustrating an example of applying pulse-width modulation in accordance with one embodiment of the invention and in contrast to conventional techniques. In one embodiment, the modulation can be desynchronized across the multiple luminaires to help reduce or eliminate a stroboscopic effect.

In conventional systems as shown at 335, a constant throughput pulse train with a fixed duty cycle, T, is generated by the pulse-width modulator 336 and applied to the LED. Likewise, a synchronized pulse train is conventionally sent to each luminaire from a drive source, such that the plurality of luminaires is pulsing in sync. In contrast, in some embodiments as illustrated at 338, an anti-stroboscopic module can be provided to induce randomness or pseudo-randomness in the modulation to avoid a repetitive pattern. Accordingly, in one embodiment, a pseudo-random timing generator 337 is applied to an anti-stroboscopic module 339 result in a slight shifting of phase, $\phi$, and period, T, in the form:

$$\phi=\phi(t); T=T(t) \qquad (63)$$

Additionally, the duty cycle does not have to be fixed but can vary as a function of time. Thus, with such techniques, the pulse train driving the luminaire can vary over time. Additionally, desynchronization across multiple luminaires can be provided such that the plurality of luminaires lighting a given environment are not driven by a synchronized pulse train. For example, different delay times can be introduced before each luminaire to desynchronize the drive signal. As another example, individual PRN generators can be provided at each luminaire so that they are not driven by the same pulse train. Schemes such as these can be implemented to reduce or even eliminate the stroboscopic effect, which, in time, can create the dazzling effect.

Figure 38:
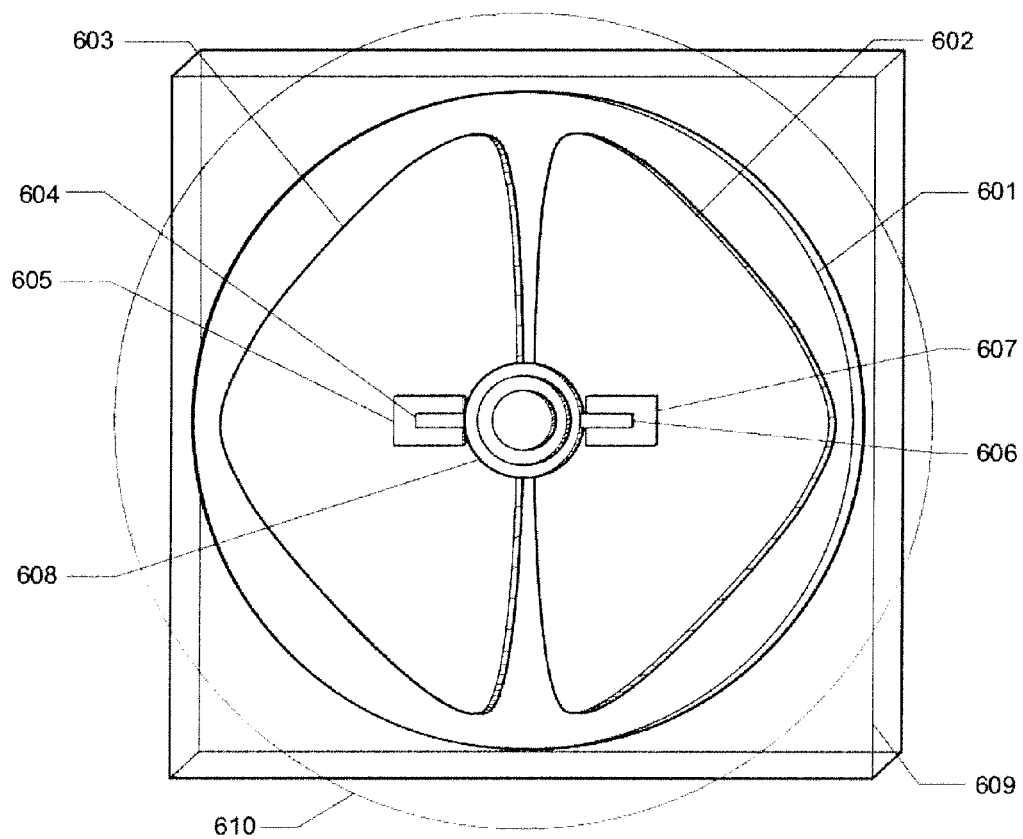
FIGS. 38 and 39 illustrate an example embodiment for thermal management where a top view (FIG. 38) and a side view (FIG. 39) are shown for a thermally-balanced LED-luminaire.
Figure 39:
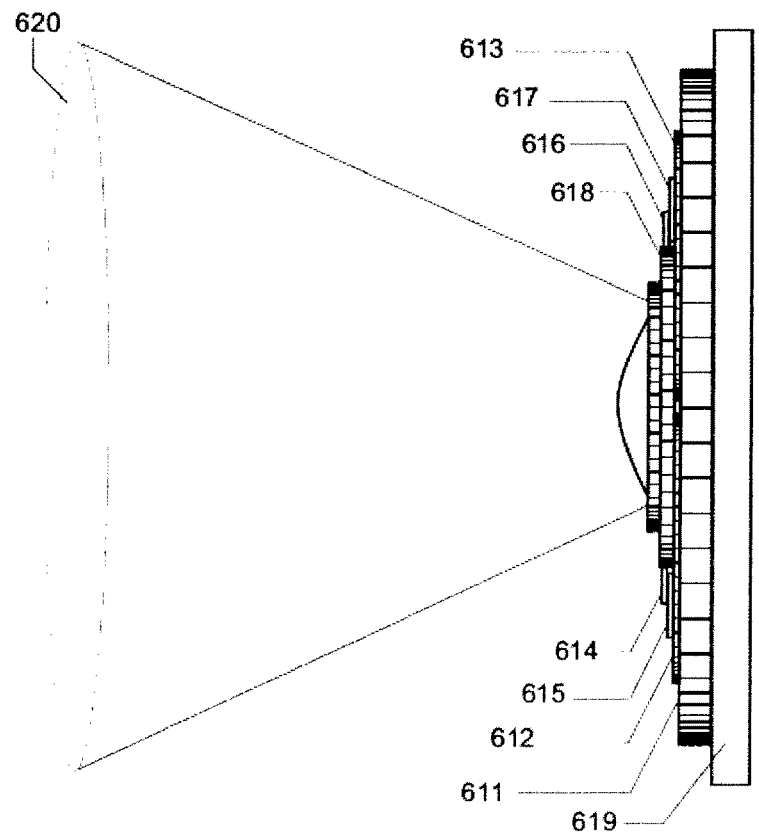

In the case of point-like-extended (PLE) sources such as LED-compound sources discussed herein above, it can be important for some applications to reduce their thermal signatures. Thermal signature reduction can be realized in some embodiments by homogenization of thermal spots created by such sources. This thermal camouflage can be used to decrease the detectability of the light sources by detectors such as infrared or other heat-sensitive detectors. FIGS. 38 and 39 illustrate an example embodiment for thermal management where a top view (FIG. 38) and a side view (FIG. 39) are shown for a thermally-balanced LED-luminaire. The top view illustrates a printed circuit board (PCB) 601, thermal relief 602, 603, LED electrical terminal (+) 604, solder pad (+) 605, LED electrical terminal (−) 606, solder pad (−) 607, LED 608, planar heat pipe/speaker 609, and optical LED beamformer 610. The side view, shown in FIG. 39, illustrates the same components from a side view. These include PCB 611, thermal relief 612, $2^{nd}$ thermal relief 613, LED electrical terminal (+) 614, solder pad (+) 615, LED electrical terminal (−) 616, solder pad (−) 617, LED 618, planar heat pipe/spreader 619, and proposed LED beamformer 620.

Heat pipes, heat spreaders, or a combination thereof can be used for various applications. This is because these can be implemented as a fully passive, almost isotropic solution with a fast heat homogenization rate. Also, aspects of this technology are mature and environmentally-hardened. The heat spreader can be conformal to a ceiling or other architectural structures to provide an integrated solution with building or environment architecture. In another embodiment, the heat spreaders can be fashioned into decoy or other shapes or patterns such as they can be used to obfuscate the sources or confuse enemies or other third parties searching for thermal signatures. For example, a heat spreader can be fashioned into the shape of a bird or other wildlife or natural object such that an observer seeing its thermal signature might be led to believe that he or she is viewing an animal or other natural phenomenon rather than a man-made apparatus.

In some embodiments, the heat is distributed to such an extent that an isothermal condition exists and there is little or no heat gradient caused by the light source. Due to this heat management homogenization (HMH) approach, the point-like heat signatures, located at the luminaires' location, will be spread uniformly over a whole region of interest. The effective thermal distribution over this region is lowered in proportion to the ratio of whole region of area interest into the actual area of the LED luminaires. In most applications, the area covered by the region of interest is much larger than the area of the LED source. In some instances, the ratio can be as high as or higher than 10,000:1. This heat homogenization process can, therefore, effectively cancel unwanted point-like thermal signatures of the proposed LED luminaires.

Because the modulation of the light intensity with temporal waveforms close to various types of biorhythms (such as a-rhythm) causes excitation of the corresponding brain waves, the concept of generalized light modulation can be important from biophysics point of view. It is useful to note that the term "frequency" can be understood in at least two ways: as electronic frequency (for example, related to the frequency of the power source or light modulation); or as optical frequency (the spectral output of the light source), where $f_{opt}=c/n\lambda$, where c is speed of light in vacuum, n is refractive index and $\lambda$ is optical wavelength. The optical frequencies can be very high in contrast to electronic frequency. For example, although a wide range of modulation schemes are possible with the embodiments disclosed herein, a few examples described in this document use pulse-width modulation operation at frequencies ranging from approximately 100 Hz, to $10^4$ Hz. Whereas for spectral output, in an example where n=1.5, and $\lambda$=2 µm (short infrared), the optical frequency is quite high; on the order of $f_{opt}=10^{14}$ Hz. This is 10-orders of magnitude higher than the highest example electronic frequency noted above. Such optical frequencies can be used to characterize an LED source's optical spectrum, which can be matched to a desired target spectrum such as the solar spectrum, for example.

Such frequency/wavelength matching can be implemented in various embodiments to be beneficial for human health or condition. For example, mimicking natural daylight spectrums, such as the dawn-to-daylight transition can provide for improved wake-up conditions in artificial lighting settings. Other examples of spectrum matching can be implemented for other purposes such as, for example, for specific medical purposes, such as skin treatment by LED lighting. This can provide safety advantages over conventional laser treatments, which can be problematic because of laser-eye-safety concerns. These example spectral enhancements of LED light are discussed herein in the context of the specific features of the luminaires discussed herein. These features can include, for example, low sensitivity (or, even neutrality) to light dispersion, or modification of the light spectrum by such optical elements as gratings and prisms. This is achieved in some embodiments by configuring the luminaire to reduce or eliminate light dispersion by the inclusion of dispersion-neutral optical elements with the luminaire. Such elements can include, for example, reflectors, diffusers or other dispersion neutral elements. Diffusers for example, behave as a random scatterer, which can also be relatively immune to light dispersion, at least to a large extent.

Embodiments of the systems and methods described herein can include spectral activation and controls to enable selective spectral configuration for the lighting output. For example, with LED light sources, a controlled spectral activation system can be included to allow the sources to be set or tuned to a variety of spectral regions. Accordingly, various effects can be achieved with the lighting systems as may be desired. In one application, for instance, the lighting can be tuned to simulate natural or quasi-natural spectra, to simulate photopic or scotopic illumination, as discussed, for example, in the Burle *Electro-Optics Handbook*. Such spectra can emulate natural lighting conditions such as dawn, full daylight, dusk or sunset, for example, from photopic to scotopic spectral characteristics, the latter a peak shifted slightly into blue, from 555 nm to approximately 510 nm. Accordingly, embodiments of the proposed LED illumination system are config- ured to augment the light spectrum with controlled amounts of blue light. This can be accomplished using an array of multiple color LEDs, including at least one blue LED, and adjusting the relative outputs thereof. Other embodiments can adjust the outputs of any or all LEDs included in a luminaire or in an array. Moreover, in a system-on-chip (SOC) integrated circuit (IC) integration, the various multi-spectral LEDs can be mixed individually. This can be an important distinction, because the action spectrum for percentage-control-adjusted melatonin suppression has a maximum at 460 nm (blue region), as shown in G. C. Brainard, et al., "Action Spectrum for Melatonin Regulation in Humans: Evidence for a Novel Circadian Photoreceptor," *The J. of Neuroscience*, vol. 22(5), pp. 6401-6412, Aug. 15, 2001. Although a broad variety of prior art luminaires have been developed, none of them has a dynamically-regulated spectral output which can be provided in some embodiments as described herein. Indeed, the luminaries in embodiments of the present invention can be configured to provide partial- or full-color mixing using multiple color LEDs. In one embodiment, a multiplicity of RGB LED modules (for example, about 100-300 LEDs each) or a multiplicity of single color LEDs in different colors (for example, mixing single LEDs of about 300 µm-size, in the SoC integration) can be provided. By selecting the appropriate quantity of LEDs for a given application based on the LED output characteristics, systems can be provided that preserve the desired intensity, angular output, and spatial profile at a given distance.

Figure 40:
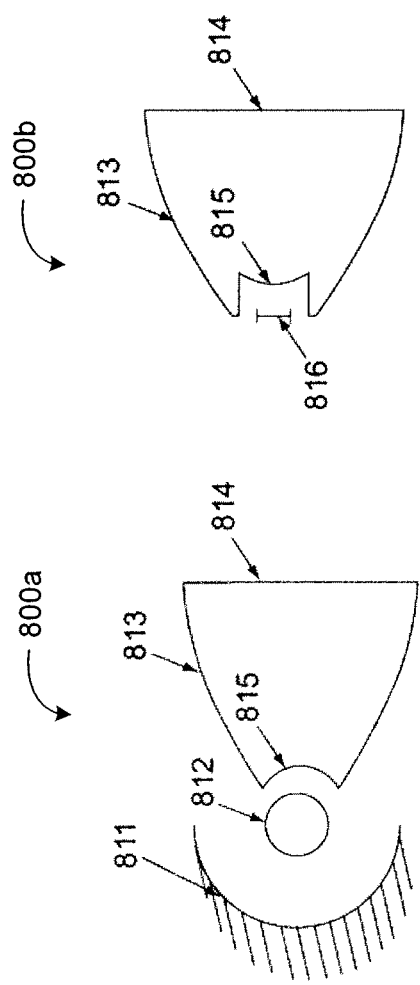
FIG. 40 is a diagram illustrating a cross-section of two example LED luminaires with cylindrical symmetry in accordance with one embodiment of the invention.

Furthermore, various embodiments are provided that have form factor in compliance with standard lighting fixtures including cylindrical fixtures such as those used for fluorescent lighting, including MIL-F-1377/17A and symbol 229.1 fluorescent light fixture form factors, for example. Therefore, one embodiment provides the luminaire as a modification of the embodiments described above but with cylindrical symmetry. FIG. 40 is a diagram illustrating a cross-section of two example LED luminaires with cylindrical symmetry in accordance with one embodiment of the invention.

In the embodiments illustrated at 800a and 800b, the components include a mirror 811, an LED array 812, total-internal-reflecting sidewall 813, a diffuser front surface 814, an interim surface 815, and flat LED array 816. It should be noted that high-power LEDs have potential to achieve efficacies of 100 µm/W (electrical watts), which is superior not only to tungsten-halogen light technology (15 µm/W), but also to fluorescent light technology (60-100 µm/W). While aluminum, indium, gallium, and phosphide compounds are used to produce red, orange, yellow, and green LED colors, indium and gallium-nitride compounds are used for UV, blue, blue-green and true green LED colors.

Figure 41:
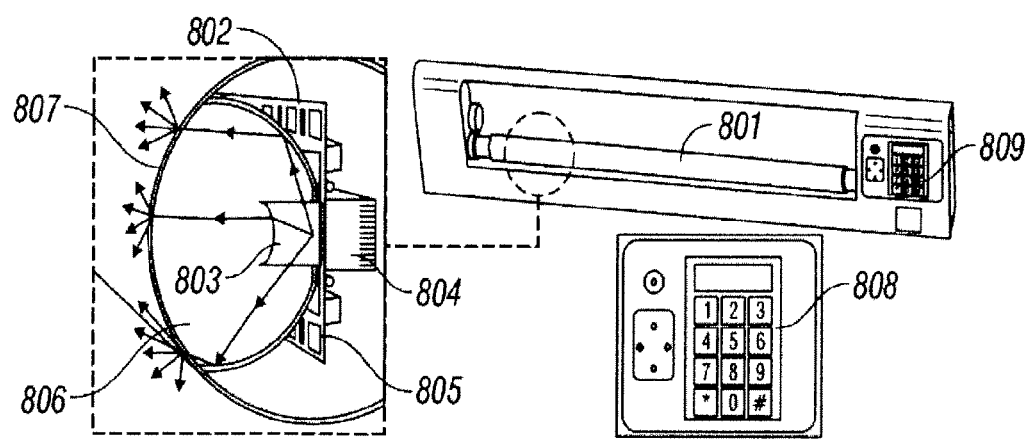
FIG. 41 is a diagram illustrating an example of an LED luminaire with cylindrical symmetry in accordance with one embodiment of the invention.
Figure 41:
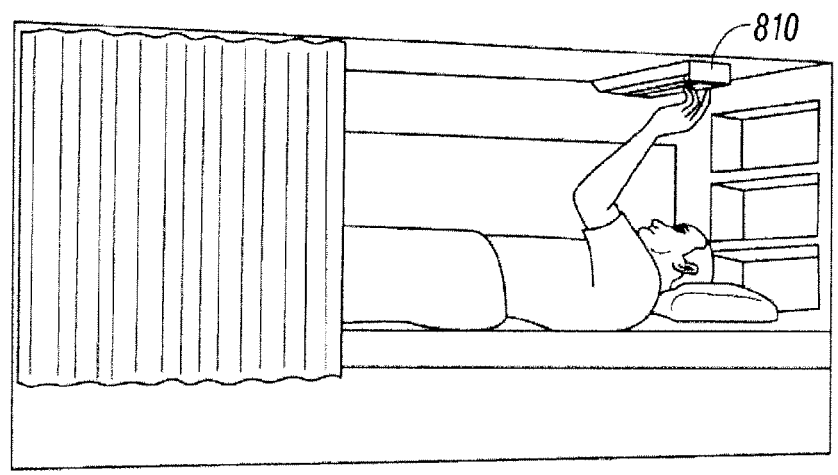

FIG. 41 is a diagram illustrating an example of a berth-adaptive LED luminaire, with cylindrical symmetry, adaptable to fluorescent light fixtures, such as MIL-F-1377/17A, symbol 229.1, for example. The embodiments illustrated include a fixture with cylindrical symmetry, such as that typically used for a fluorescent light fixture form factor 801 (with its cross-section illustrated at 802). For such embodiments, the luminaire can be manufactured such it can be fitted to these conventional form factors. For example, a beam transformer can be extruded or otherwise manufactured in an elongated fashion to fit the desired form factor and provide light output in a pattern similar to, for example, conventional fluorescent tubes.

These example embodiments also include an LED module 803, a heat sink 804, a printed circuit board for control and drive electronics 805, a beam transformer 806, and a diffusive front-surface profile designed to control homogenous angular lighting output 807. Also illustrated is a control module 808 that can be used to adjust and program the light output of the light fixture 801. The control module 808 can include a processor or other control logic and a keyboard and display to facilitate settings, adjustment and programming, and can be separate from or integrated with the fixture as shown at 809. In various embodiments, control module 808 can provide an interface for the user to provide direct control of the light output of the luminaire (light fixture 801 or other luminaire) with which it is interfaced. Accordingly, control module 808 can be configured to allow the user to turn the fixture on or off, adjust the brightness settings, adjust the spectral output and so on.

Additionally, control module 808 can be configured to allow the user to program the fixture for predetermined operations. For example, the user can be given the capability to set the fixture for automatic turn-off times, to program wake-up times and other like operations. The system can also be configured such that certain operational modes (such as, for example, wake-up modes and sleep modes) are associated with predetermined spectral characteristics. These can be preprogrammed into the system are set by the user as desired. As an example, the spectrum characteristics of the light output can be configured to simulate lighting conditions at dawn for wake-up times and lighting conditions at dusk for sleep times. Additionally, the speed at which the luminaire transitions from and off state to and on state and vice a versa can be set. For example, a wake-up time can be associated with a gradual increase in intensity such as occurs in a natural sunrise. For ease of use, the characteristics of certain operations such as wake-up operations can be preprogrammed such that the user does not need to worry about setting options such as spectral output or rate of increase of illumination. Alternatively, each of the characteristics can be customizable by individual users.

While control module 808 is illustrated in FIG. 41 as associated with an individual light fixture 801, a control module 808 can be configured to control the lighting for one or more luminaires in a personal space (such as a bunk or a room) as well as one or more luminaires in a common space used by many individuals. Likewise, control systems can be included control lighting for multiple different applications such as buildings, ships, submarines, and just about any environment including artificial lighting. Control of luminaire characteristics such as turn-on and turn-off rates, spectral characteristics, and so on can allow somewhat natural conditions to be simulated in an environment that typically receives little or no natural light such as, for example, a submarine.

As stated above, various embodiments control the duty cycle of the drive signal to allow control of intensity. It is also stated above, variations in light output as a result of the drive frequency can, in some instances, create discomfort for users. Accordingly, one embodiment provides a control mechanism that varies the modulation of the various luminaires in a multi-luminaire environment. For example, the frequency and duty cycle used to drive each luminaire in a multi-luminaire system might be the same, however it might be offset from one luminaire to the next such that the luminaires are not all changing their light output in the same way at the same time. This can reduce the impact of using a pulse-width modulated signal to drive the light sources.

This can be accomplished in a number of different ways, depending on system configuration. For example, where a common drive circuit is used to drive multiple luminaires, delay segments can be placed in the signal paths to the luminaires to cause an offset in transition times of the drive signal at the various luminaires. In another embodiment, the frequencies at which various luminaires in the system are driven can be different from one luminaire to the next to create a randomness in the variations across the plurality of luminaires. As these examples serve to illustrate, there are a number of techniques that can be used to avoid a situation where a large number of luminaires are being driven in such a way that her output will fluctuate in sync.

Figure 42:
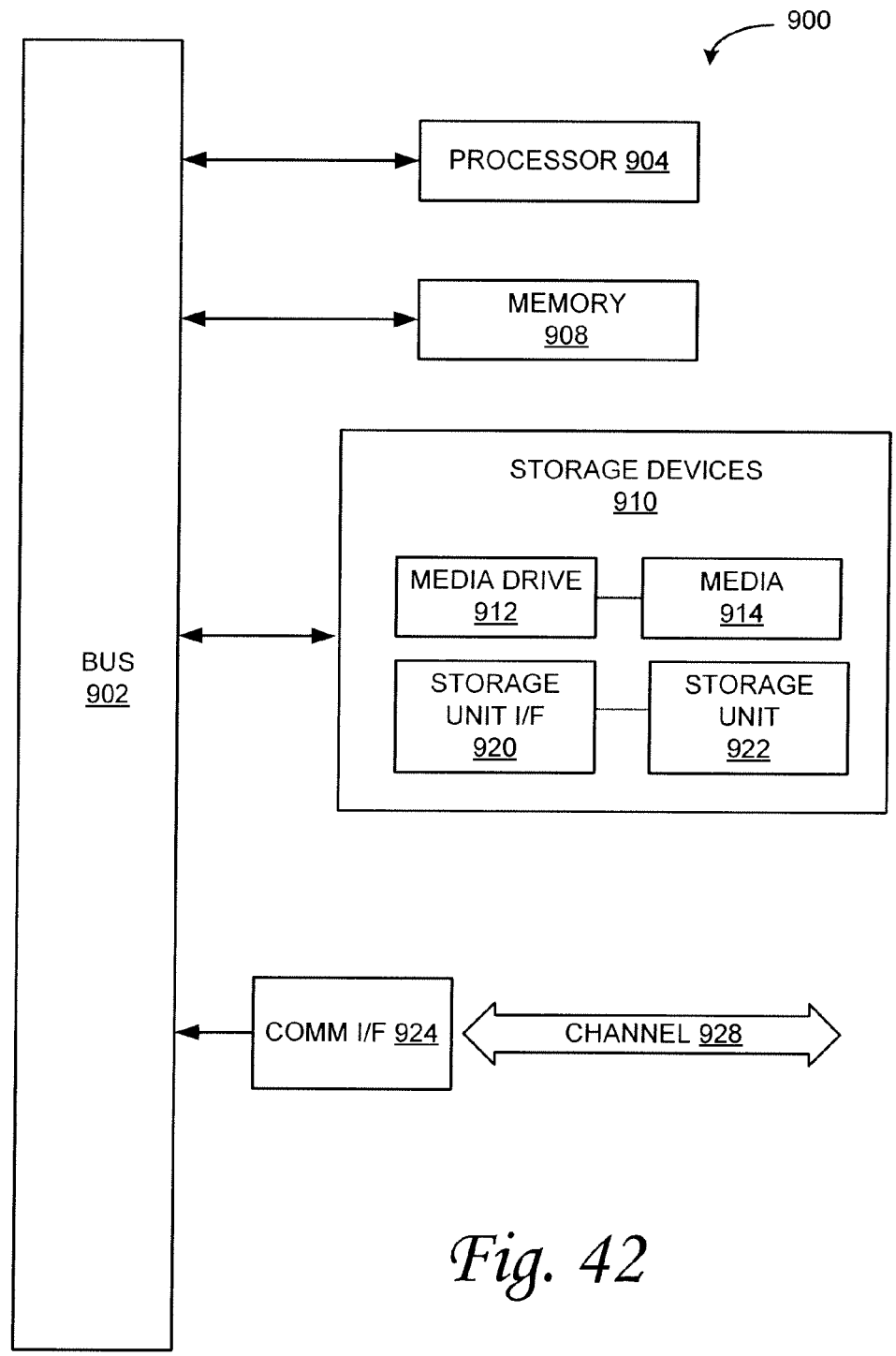
FIG. 42 is a diagram illustrating an example computing module in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 42. Various embodiments are described in terms of this example-computing module 900. After reading this description, it will become apparent to a person skilled in the relevant art how to implement the invention using other computing modules or architectures.

Referring now to FIG. 42, computing module 900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the example illustrated in FIG. 42, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914, might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. These signals can deliver the software and data from memory or other storage medium in one computing system to memory or other storage medium in computing system 900. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 908, storage unit 920, and media 914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A non-imaging beam transformer, comprising:
an input surface configured to be proximate a predetermined light source and configured to receive light from the light source, a body portion bound by a lateral surface, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles.

2. The beam transformer of claim 1, wherein the body portion comprises a positive refraction spherical lens for low source output angles and the lateral surface comprises a total internal reflection lateral surface for high source output angles.

3. The beam transformer of claim 1, wherein the output surface comprises a power output refractive surface to reduce divergence from point-like-extended sources.

4. The beam transformer of claim 1, further comprising a Fresnel plate proximal the output surface and configured to redirect light output from the beam transformer in accordance with the transformation pairs.

5. The beam transformer of claim 1, wherein the output surface comprises two power refractive surfaces and further comprising a Fresnel plate proximal the output surface.

6. The beam transformer of claim 1, further comprising a rod disposed internally to the beam transformer and a plurality of light sources arranged around the rod, and wherein the lateral surface comprises quasi-parabolic reflector surfaces of rotation around the rod.

7. The beam transformer of claim 6, wherein the lateral surface is a metallic surface.

8. The beam transformer of claim 1, wherein the light source is a point-like extended source with a source point response that has been obtained by an adaptive deconvolution process, based on tailored output distribution at a region of interest and a point-like-extended source intensity distribution in the form of circus function.

9. The beam transformer of claim 1, wherein the output surface comprises a diffuser front surface with divergent angles sufficiently large to substantially reduce ripples of an output illumination distribution.

10. The beam transformer of claim 1, wherein the diffuser front surface is made using an injection molding process.

11. The beam transformer of claim 1, wherein the beam transformer and the diffuser are a monolithic structure.

12. The beam transformer of claim 1, wherein the diffuser is a separate structure attached to the front surface of the beam transformer.

13. The beam transformer of claim 1, wherein the output surface comprises a diffuser front surface.

14. The beam transformer of claim 1, wherein the output surface comprises a diffuser front surface.

15. The beam transformer of claim 1, wherein the beam transformer has cylindrical symmetry.

16. The beam transformer of claim 1, wherein the beam transformer has cylindrical symmetry and a profile of a length greater than twice the width.

17. The beam transformer of claim 1, wherein the beam transformer has cylindrical symmetry and is dimensioned to fit into a luminaire housing configured for conventional fluorescent tubes.

18. A method for illuminating an area of interest of a predefined geometry, using overlapping spots with Gaussian distribution, using an array of luminaires arranged in a hexagonal array or rectangular array, wherein the luminaires comprise an input surface configured to be proximate a predetermined light source and configured to receive light from the light source, a body portion bound by a lateral surface, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles.

19. The method of claim 18, wherein a normalized intensity distribution of a luminaire is described by the Gaussian formula:

$$\exp\left[\frac{-r^2}{(0.4a^2)}\right],$$

where r– is distance from a center of a luminaire and a is an array constant such that a is a distance between luminaires.

20. An array of luminaires configured to illuminate a region of interest of a predefined geometry, using overlapping spots with Gaussian distribution at the region of interest, the array of luminaires arranged in a hexagonal array or rectangular array, wherein the luminaires comprise an input surface configured to be proximate a predetermined light source and configured to receive light from the light source, a body portion bound by a lateral surface, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles.

21. The array of luminaires of claim 20, wherein an observer's eye level is at a level different from a level of the region of interest, and wherein the luminaires appear in direct view for an observer at eye level as no more than one or two point sources.

22. The array of luminaires of claim 20, further comprising a MOSFET switch to power a microcontroller used to control illumination of the light source for each luminaire.

23. The array of luminaires of claim 20, wherein voltage adjustment to drive the source is configured as a closed-loop system with the source and operates as a current-sensitive amplifier.

24. The array of luminaires of claim 20, further comprising a pulse-width modulated data generator coupled to the microcontroller to drive the light source with a time varying input signal.

25. The array of luminaires of claim 20, further comprising delay modules disposed between the data generator and the luminaires, wherein the delay modules are configured to desynchronize the pulse-width modulated signal used to drive the plurality of luminaires.

26. The array of luminaires of claim 20, wherein each luminaire further comprises a pulse-width modulated data generator and a pseudorandom number generator coupled to the data generator and having an output coupled to drive the microcontroller to desynchronize the array of luminaires.

27. A non-imaging beam transformer having a form factor configured to fit conventional cylindrical housings, comprising:
an input surface configured to be proximate a predetermined light source and configured to receive light from the light source, a body portion bound by a lateral surface and characterized as having a cylindrical symmetry, and an output surface further defining the body portion, wherein the lateral surfaces are defined based a plurality of transformation pairs for the predetermined light source and the desired illumination profile in a region of interest, and wherein the transformation pairs identify the radii of illumination of the light source at given source output angles.

\* \* \* \* \*